United States Patent
Wessel et al.

(10) Patent No.: US 9,839,111 B2
(45) Date of Patent: Dec. 5, 2017

(54) STAGED Z-PINCH FOR THE PRODUCTION OF HIGH-FLUX NEUTRONS AND NET ENERGY

(75) Inventors: Frank J. Wessel, Irvine, CA (US);
Hafiz Ur Rahman, Riverside, CA (US);
Norman Rostoker, Irvine, CA (US);
Paul Ney, Moreno Valley, CA (US)

(73) Assignee: The Regents of the University of California, Oakland, CA (US)

( * ) Notice: Subject to any disclaimer, the term of this patent is extended or adjusted under 35 U.S.C. 154(b) by 2035 days.

(21) Appl. No.: 12/847,843

(22) Filed: Jul. 30, 2010

(65) Prior Publication Data
US 2011/0182392 A1    Jul. 28, 2011

Related U.S. Application Data

(60) Provisional application No. 61/230,085, filed on Jul. 30, 2009.

(51) Int. Cl.
*H05H 3/06* (2006.01)
*H05H 5/06* (2006.01)
*H05H 1/06* (2006.01)
*H05H 6/00* (2006.01)

(52) U.S. Cl.
CPC ............... *H05H 3/06* (2013.01); *H05H 1/06* (2013.01); *H05H 6/00* (2013.01)

(58) Field of Classification Search
None
See application file for complete search history.

(56) References Cited

PUBLICATIONS

Bennett et al., "Symmetric Inertial-Confinement-Fusion-Capsule Implosions in a Double-Z-Pinch-Driven Hohlraum," Phys. Rev. Letters v. 89 No. 24 Dec. 2002.*
Rahman et al., "Staged Z-Pinch," Phys. Rev. Letters v. 74 No. 5 Jan. 1995.*
Bailey et al., "Hot Dense Capsule-Implosion Cores Produced by Z-Pinch Dynamic Hohlraum Radiation," Phys. Rev. Letters v. 92 No. 8 Feb. 2004.*

* cited by examiner

*Primary Examiner* — Sean P Burke
(74) *Attorney, Agent, or Firm* — Marcus C. Dawes; Daniel L. Dawes

(57) ABSTRACT

A fusible target is embedded in a high Z liner, ohmically heated and then shock wave heated by implosion of an enveloping high Z liner. The target is adiabatically heated by compression, fusibly ignited and charged-particle heated as it is being ignited. A shock front forms as the liner implodes which shock front detaches from the more slowly moving liner, collides with the outer surface of the target, accelerates inward, rapidly heating the target, adiabatically compressing the target and liner and amplifying the current to converge the liner mass toward a central axis thereby compressing the target to a fusion condition when it begins to ignite and produce charged particles. The charged particles are trapped in a large magnetic field surrounding the target. The energy of the charged particles is deposited into the target to further heat the target to produce an energy gain.

12 Claims, 19 Drawing Sheets

CURRENT DENSITY AT 100ns
FIG. 3A
R=2.0 cm
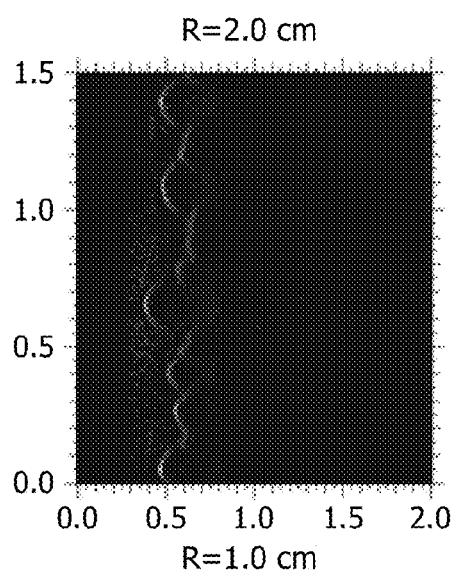
FIG. 3B
R=1.5 cm
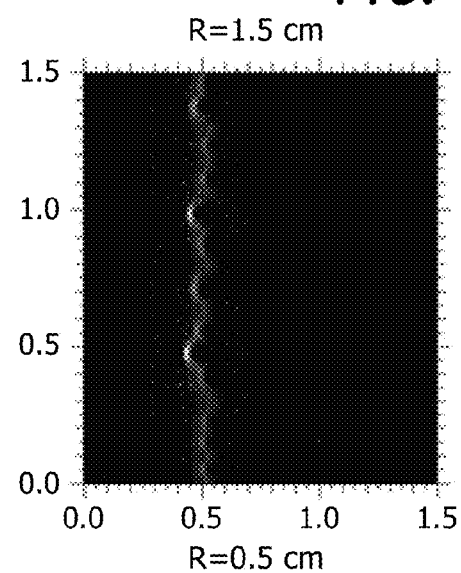
R=1.0 cm
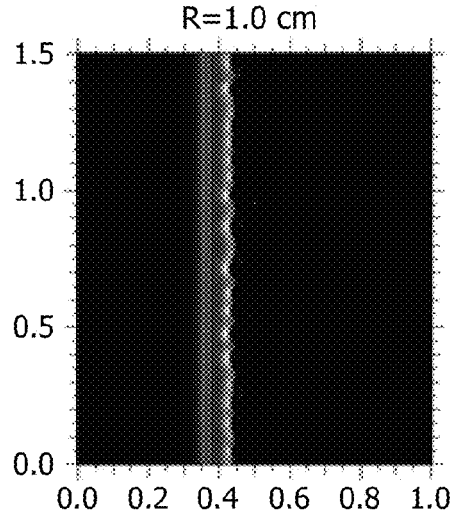
R=0.5 cm
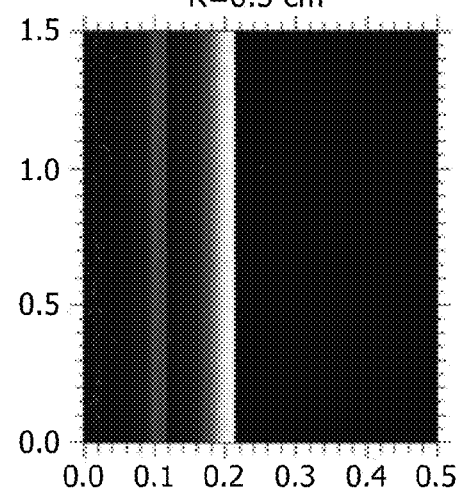
FIG. 3C
FIG. 3D

ION DENSITY
$\hat{n}_i$ (cm$^{-3}$) = 3 X 10$^{24}$

CURRENT DENSITY
$\hat{J}_z$ (A/m$^2$) = 2.6 X 10$^{15}$

ION TEMPERATURE
$\hat{T}_i$ (eV) = 54 keV

MAGNETIC FIELD
$\hat{B}_\theta$ (G) = 5.60 X 10$^8$

STAGED Z-PINCH FOR THE PRODUCTION OF HIGH-FLUX NEUTRONS AND NET ENERGY

RELATED APPLICATIONS

The present application is related to U.S. Provisional Patent Application, Ser. No. 61/228,532, filed on Jul. 24, 2009, and 61/230,085 filed on Jul. 30, 2009, which are incorporated herein by reference and to which priority is claimed pursuant to 35 USC 119.

This invention was made with Government support under grant DE-FG02-06ER54877 and DE-FG03-93ER54220 awarded by the US Department of Energy. The Government has certain rights in the invention.

BACKGROUND OF THE INVENTION

Field of the Invention

The invention relates to the field of Z-pinch apparatus and methods for nuclear fusion for neutron.

Description of the Prior Art

Thermonuclear fusion energy production has yet to be demonstrated in the laboratory where the energy produced is greater than the energy injected to create the reaction. Several approaches are being pursued around the world.

The simple Z-pinch is a cylindrical plasma column that implodes to the axis of symmetry when subjected to a large, sustained-current pulse. A typical or conventional Z pinch load is constructed from a wire-array, foil, plasma jet, or gas-puff, or combinations thereof. When driven by a modern, low-inductance, high-voltage, pulse-power circuit, the pinch-current pulse can reach many megaamperes and the delivered power 100's of terawatts. Z-pinch plasmas with keV temperatures and near-solid densities are produced routinely. The Z Facility at the Sandia National Laboratory is perhaps the best example: it produces a 20 MA, 100 ns rise time, 100 TW current pulse and a conventional Z pinch that can radiate mega-joules of X-ray energy in a few nanosecond pulse. Such plasmas are of great scientific and technical interest, for example in studies related to fusion, atomic physics, laboratory astrophysics, etc.

The Z-pinch dynamics is comprised of three phases: implosion, stagnation, and disassembly. The implosion phase is when the discharge-current builds and the pinch is driven radially inward by the $J_z \times B_\theta$ force, where $J_z$ is the vector axial, plasma-current density and $B_\theta$ is the vector azimuthal, self-magnetic field. At the stagnation phase the pinch is confined briefly, typically for a few nanoseconds when the radial motion of the pinch has ceased, or nearly so, and the plasma is compressed to a high-energy density. Generally, the imploded mass and the initial-pinch radius are adjusted so that stagnation occurs after the current maximum.

At stagnation the implosion-kinetic energy and the inductive energy, stored local to the pinch, is rapidly converted into plasma-internal energy. Shock heating is important. The small radius of the pinch plasma at stagnation also increases its electrical resistance, enhancing the energy deposited by Ohmic heating. MHD instabilities occur in this phase: typically, for example the (m=0) sausage instability or the (m=1) kink instability.

A fusion burn will result if the Z-pinch remains stable for a sufficiently long time, while the required high temperature and density are sustained. Ignition is possible, if the fusion products are sufficiently well-confined. This will occur if the azimuthal-magnetic field is sufficiently intense that fusion α particles are confined, that is, $\rho_\alpha \ll R_{pinch}$, where $\rho_\alpha$ is the α particle gyro-radius and $R_{pinch}$ is i the compressed pinch radius.

Following stagnation the pinch disintegrates rapidly, due to the rebound in plasma pressure and the accumulated effect of instabilities. Z pinches are susceptible to the Rayleigh-Taylor (RT) instability during implosion. Many techniques have been developed to control the effect of the RT instability, all directed toward maximizing the accumulated-pinch energy. The most common techniques consist of altering the load configuration to provide a more uniform, initial-mass distribution, or reducing the time needed to obtain a uniform, highly-conducting plasma at current initiation. Other approaches involve decreasing the rise time of the current pulse and using concentric, multi-layer mass distributions.

The gas-puff Z-pinch was developed in the 1970's as a stable alternative to the more widely used wire array Z-pinches and has demonstrated a surprisingly large range of scalability; having been implemented on short- and long-implosion time generators, with rise times, $\tau_{1/4} \approx 0.1-1$ μs and load currents, $I_{load} \approx 0.1-10$'s of MA. Gas-puff pinches have also been configured to study gas mixtures. Gas-mixture Z-pinches have demonstrated a unique ability to produce a higher energy radiated spectrum and higher X-ray yield, than a Z-pinch of either gas imploded separately. Multi-layer gas-puff implosions have also produced better results than single layer, or uniform-fill Z-pinch.

The improvements observed for gas mixtures and multi-shell implosions suggests that there is a complex interplay of shock-driven compression heating, current-diffusion, flux-compression, and radiation-transport at work, for which further analysis will provide deeper insights. Staging the implosion, to optimize these dynamical processes, is expected to have specific benefits for fusion. A gas-puff mixture of deuterium and argon was tested recently, with a reported neutron yield of, $Y \approx 3.7-3.9 \times 10^{13}$; modeling suggests that the neutrons are thermonuclear.

BRIEF SUMMARY OF THE INVENTION

A fusible target is embedded in a high Z liner, ohmically heated and then shock wave heated by implosion of a high Z liner around the target. The target is adiabatically heated by compression, the embedded fusible target ignited and charged-particle heated as it is being ignited. A shock front forms as the liner implodes which shock front detaches from the more slowly moving liner, collides with the outer surface of the target, accelerates inward, rapidly heating the target, adiabatically compresses the target and liner and amplifies current in the target and liner to converge the liner mass toward a central axis of the fusible target thereby compressing the target to a fusion condition when it begins to ignite fusion reactions and produces charged particles. The charged particles are trapped in a large magnetic field surrounding the target and the energy of the charged particles is deposited into the target to further heat the target to produce an energy gain.

Staged Z-pinch fusion is a controlled compression and heating of a fusible material to a temperature and pressure such that fusion can begin and excess energy then extracted and the resulting neutron flux used for production purposes. The staged Z-pinch fusion may be used to produce net energy gain many times larger than the energy used to drive the pinch, Z is represents the atomic number of the element used in the liner surrounding the fusible material to be compressed. One of the features of the illustrated embodiment is the utilization of the physics responsible for producing fusion, comprising stages of shock heating and compression, and confinement of fusion alpha particles, leading to target ignition. Fusion energy production has many problems in a Z-pinch configuration with plasma instabilities are the primary limitation. When the plasma is compressed instabilities prevent the accumulation of plasma with a sufficiently high-energy density to ignite fusion.

The specific configuration of the staged Z-pinch provides for a stable implosion by delivering the compression energy to the target in multiple successive steps, each with a shorter duration, causing power amplification and eventually the attainment of fusion conditions.

In this method and apparatus a very large current flows through a cylindrical liner high-Z plasma surrounding an embedded low-Z target plasma, the nuclei of which target can fuse to release thermonuclear energy in the form of neutrons and charged (alpha) particles. In the final stage the alpha particles are trapped due to the extremely large magnetic field, which is a special feature of the staged Z-pinch, and cause ignition, which is a requirement for high energy gain.

The basis for the staged Z-pinch is the ability to control plasma instabilities, target-plasma heating due to shock heating and shock compression, and therefore, efficient-energy coupling. A high repetition-rate, pulsed-power driver is used to drive a staged Z-pinch as pulsed source of fusion neutrons. The staged Z-pinch is a specific plasma configuration, comprising a cylindrical, high-atomic-number liner of radon, xenon, krypton or other inert gas, and a co-axial, low-atomic number, relatively low mass hydrogen isotope target of deuterium, or deuterium-tritium. The pulsed power source provides a fast rise time current pulse that causes the liner to implode onto the target.

The specific configuration provides a stable compression of the liner and formation of a shock front that compresses and heats the target plasma rapidly to the high temperature ($>5$ KeV) and high density ($>10^{23}$ cm$^{-3}$) needed for fusion. The high Z liner acts as a radiation trap for the target and also allows the magnetic field to be assembled to ultra-high values ($>10$ MG).

A high flux of neutrons is produced. Depending on the specific fuel used, the fusion neutrons will range in energy from 2.45-14.1 MeV and can be captured to heat a liquid in a thermodynamic energy production cycle.

One of the embodiments of the invention is used to produce net energy gain by releasing the thermonuclear fusion energy using relatively inexpensive hydrogenic fuel like deuterium and tritium. This embodiment of the invention has no prior use in the commercial sector, but has tremendous potential for producing electric power in the energy industry.

Basically, staging resets the clock on the energy accumulation in a fusible target, allowing it to be accumulated with greater power, more efficiently, and in the most stable manner, than can be achieved in a conventional Z-pinch. Studies on experimental systems using a microsecond-implosion time, coupled with theoretical and computational analysis, provide evidence that staging works and the potential for this concept to be scaled to fusion conditions.

The configuration analyzed in the illustrated embodiments is referred to as a "staged Z-pinch" and comprises a high atomic-number plasma liner imploding onto a solid-fill hydrogenic target: for example, Xe onto a deuterium and/or tritium or a mixture thereof (DT). However, it is within the scope of the invention that other fusible fuels could be selected as desired. This specific name was applied to characterize sequential, energy-transfer processes that occur in these more complex load configurations, leading to faster-rise time in the presence of improved stability. As the current builds in the staged Z-pinch and the outer liner begins to accelerate, shocks form, transporting current and energy radially inward toward the target plasma. As the shock collides with the DT, a secondary shock is produced in the target that also transports current and energy, pre-heating the target. As the liner continues to accelerate and compress the target, a fusion burn begins in the presence of a flux-compressed, ultra-high magnetic field. The ultra-high magnetic field confines fusion α particles, providing an additional source of heat for the DT, raising its temperature to 50 keV and causing ignition in a magneto-inertial compression. For a precise set of initial-implosion parameters, net-fusion energy is produced. In the absence of shocks the radial-compression ratio needed for fusion to occur, by adiabatic compression alone, would be much higher.

In one embodiment what is disclosed is a high yield neutron source produced by thermonuclear fusion in a staged Z-pinch; where the load is a xenon-plasma liner imploding onto a deuterium-tritium plasma target and the driver is a 2 MJ, 17 MA, 95 ns rise time pulser. The implosion system is modeled here using the dynamic, 2½ dimensional, radiation-MHD code, MACH2. During implosion a shock forms in the Xe liner, transporting current and energy radially inward. After collision with the target composed of a plasma composed of a deuterium and/or tritium mixture (DT), a secondary shock forms pre-heating the DT to several hundred eV. Adiabatic compression leads subsequently to a fusion burn of the target plasma, as the target is surrounded by a flux-compressed, intense, azimuthal-magnetic field. The intense-magnetic field confines fusion α particles, providing an additional source of ion heating that leads to target ignition. The target remains stable up to the time of ignition. Predictions are for a neutron yield of $3.0 \times 10^{19}$ and a thermonuclear energy of 84 MJ, that is, 42 times greater than the initial, capacitor-stored energy. This source can be used for production of electrical energy as well as production of radionuclides by neutron activation method.

More particularly the illustrated embodiments include a method for using staged Z-pinch plasma compression to produce net energy gain comprising the steps of providing a fusible target embedded in a high Z liner, ohmically heating the fusible target embedded in a high Z liner, shock heating the embedded fusible target, adiabatically heating the embedded fusible target by compression; igniting the embedded fusible target; and charged-particle heating the embedded fusible target as the embedded fusible target is being ignited.

The fusible target embedded in a high Z liner forms a plasma and the steps of ohmically heating, shock heating, adiabatically heating and charged-particle heating the fusible target are performed with progressively smaller time durations and correspondingly higher ion heating power while preserving the stability of the plasma.

The step of providing a fusible target embedded in a high Z liner comprises forming a central plasma of the fusible target and embedding the fusible target in a selected co-axial high Z liner and further comprising maintaining an implosion cycle duration less than that which is capable of causing disruption due to instability of the central plasma.

The step of shock heating the fusible target comprises preventing instabilities in a plasma created in the fusible target.

The method comprises repeating the steps of ohmically heating, shock heating, adiabatically heating and charged-particle heating the fusible target at a high repetition-rate using a pulsed-power driver while controlling plasma instabilities.

The step of providing a fusible target embedded in a high Z liner comprises providing a plasma configuration characterized as an outer enveloping liner of radon, xenon, or krypton outer liner, and an inner enveloped hydrogen isotope target.

The method further comprises the step of providing a pulsed power source to provide a fast rise time current pulse to cause the high Z liner to implode onto the fusible target to provide a stable compression of the liner and formation of a shock front that compresses and heats the target plasma rapidly to a temperature >5 keV and a particle density >$10^{23}$ cm$^{-3}$.

The method further comprises the step of producing fusion in a predominantly neutron-free (aneutronic) reaction using aneutronic fusion fuel including deuterium and helium-3, or hydrogen and boron-11.

The steps of shock heating, adiabatically heating, igniting charged-particle heating the embedded fusible target comprise forming a shock front as the liner implodes which shock front detaches from the slower-moving liner, colliding the shock wave with the outer surface of the target, accelerating the shock wave inward, rapidly heating the target, adiabatically compressing the target and liner and amplifying current in the target and liner to converge the liner mass toward a central axis of the fusible target to compress the target to a fusion condition to begin to ignite fusion reactions, producing charged particles, trapping the charged particles in a large magnetic field surrounding the target and depositing the energy of the charged particles into the target to further heat the target to produce an energy gain.

The method further comprises the step of producing a high flux of pulsed neutrons, with an energy equivalent yield greater than the energy required to assemble the reaction.

The method further comprises the step of selecting a liner initial radius, liner thickness, liner linear mass distribution and the target initial radius, target thickness, target linear mass distribution to result in staged target ignition.

The method further comprises the step selecting a precise set of initial-implosion parameters to produce net-fusion energy.

The illustrated embodiments also include within their scope an apparatus for using staged Z-pinch plasma compression to produce net energy gain comprising a staged Z-pinch chamber for holding a fusible target embedded in a high Z liner; and a pulsed power driver coupled to the staged Z-pinch chamber to perform staged Z-pinched fusion in the staged Z-pinch chamber by ohmically heat the fusible target embedded in the high Z liner, to shock heat the embedded fusible target, to adiabatically heating the embedded fusible target by compression, to igniting the embedded fusible target and to charged-particle heat the embedded fusible target as the embedded fusible target is being ignited.

The pulsed power driver comprises a high repetition-rate using a pulsed-power driver capable of repeating the steps of ohmically heating, shock heating, adiabatically heating and charged-particle heating a repeatedly supplied charge of the fusible target delivered to the staged Z-pinch chamber while controlling plasma instabilities.

The staged Z-pinch chamber is arranged and configured to provide a fusible target embedded in a high Z liner characterized as an outer enveloping liner of radon, xenon, or krypton, and an inner enveloped hydrogen isotope target.

The pulsed power driver generates a fast rise time current pulse to cause the high Z liner to implode onto the fusible target to provide a stable compression of the liner and formation of a shock front that compresses and heats the target plasma rapidly to a temperature >5 keV and a particle density >$10^{23}$ cm$^{-3}$.

The staged Z-pinch chamber is arranged and configured to produce fusion in a predominantly neutron-free (aneutronic) reaction using aneutronic fusion fuel including deuterium and helium-3, or hydrogen and boron-11.

The staged Z-pinch chamber is arranged and configured to provide shock heating, adiabatically heating, igniting charged-particle heating of the embedded fusible target to form a shock front as the liner implodes which shock front detaches from the slower-moving liner, collides with the outer surface of the target, accelerates inward while rapidly heating and adiabatically compressing the target and liner to amplify current in the target and liner and to converge the liner mass toward a central axis of the fusible target to compress the target to a fusion condition to begin to ignite fusion reactions, thereby producing charged particles, then trapping the charged particles in a large magnetic field surrounding the target created by the pulsed power driver and depositing the energy of the charged particles into the target to further heat the target to produce an energy gain.

The staged Z-pinch chamber is arranged and configured to produce a high flux of pulsed neutrons with an energy equivalent yield greater than the energy required to assemble the reaction.

The staged Z-pinch chamber is sized to provide a selected liner initial radius, liner thickness, and liner linear mass distribution and to provide a selected target initial radius, target thickness, and target linear mass distribution which results in staged target ignition within the staged Z-pinch chamber.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 3*a*-3*d* are two dimensional depictions of the current density (R-Z) iso-contour profiles computed 100 ns into the implosion as a function of the initial radius: $R_i$=2.0 cm, 1.5 cm, 1.0 cm and 0.5 cm respectively. The horizontal and vertical axes correspond to the radial and axial coordinates, respectively, and the units are in cm. White color corresponds to highest computed intensity.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
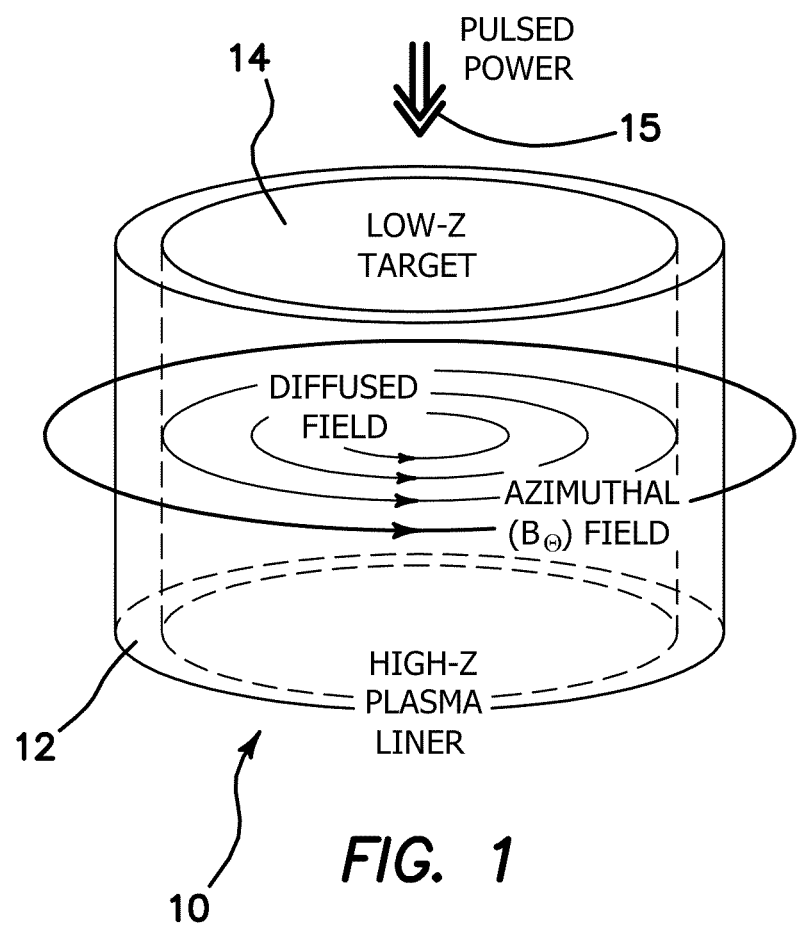
FIG. 1 is a schematic diagram of a staged Z-pinch load region.
Figure 13:
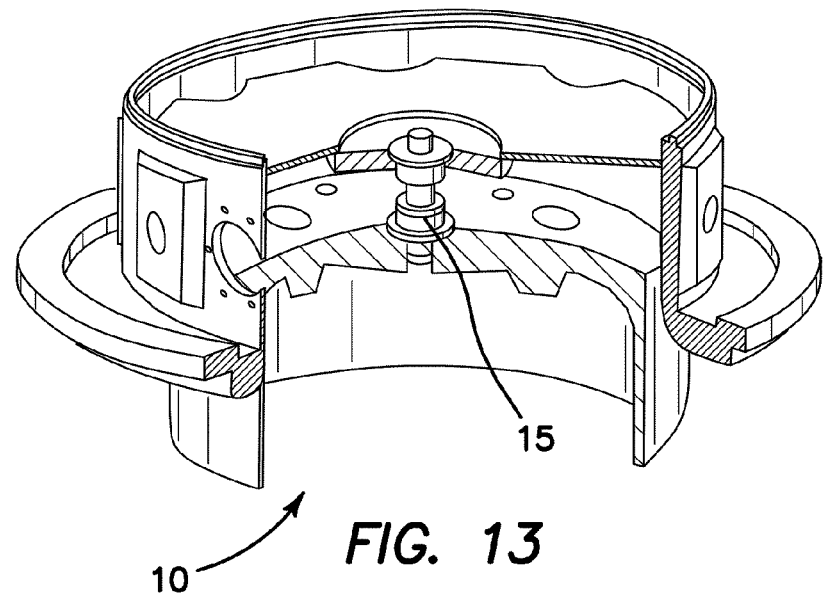
FIG. 13 is a cutaway view of a staged Z-pinch chamber usable with the illustrated embodiments of the invention.
Figure 14:
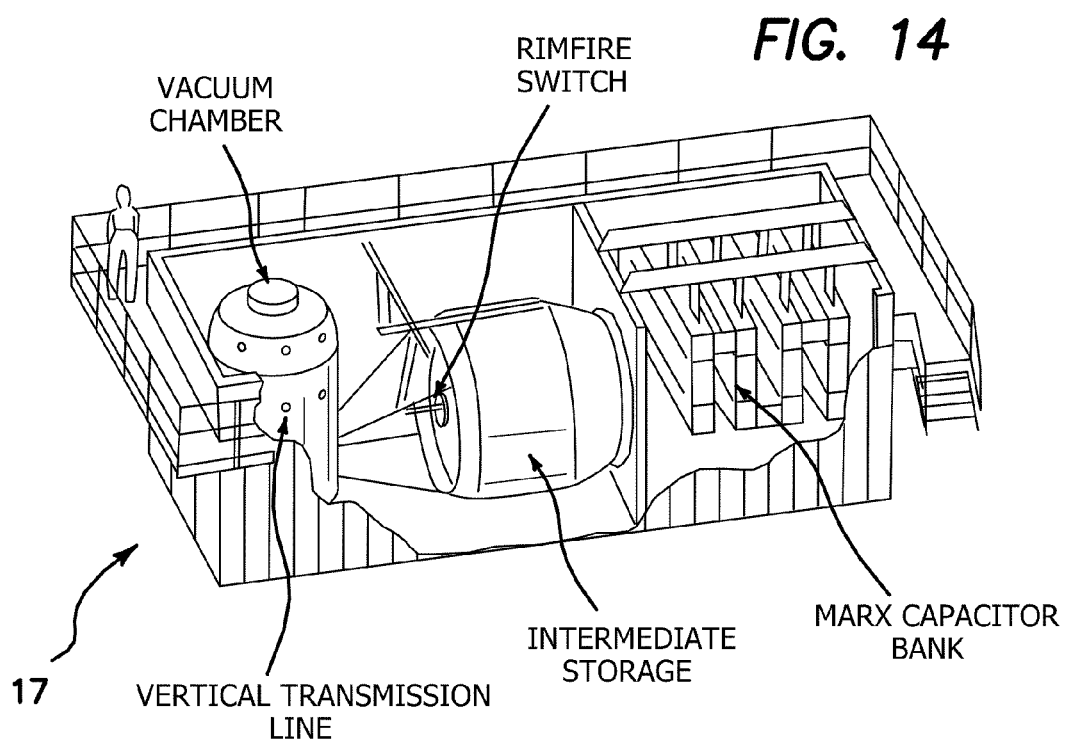
FIG. 14 is a three dimensional rendering of a pulsed power generator which is capable of producing the pulsed currents used in the staged Z-pinch chamber of the illustrated embodiments.

The illustrated embodiments are directed toward the production of a magnetically-accelerated, inertially-confined, high-energy-density pinch. FIG. 1 illustrates schematically the plasma load of a staged Z-pinch chamber 10, where the fusion reaction takes place. The dimensions of the staged Z-pinch chamber 10 are nominally 1-cm high×1-cm diameter. This fusible load 14 is placed at the center of a transmission line of pulsed power 15 which delivers a pulsed-electric current to the plasmas 12, 14, for example as shown in a cutaway view of a chamber 10 shown in FIG. 13. The approximate current parameters are 1 MA and 1 MV, delivered in 100 nanoseconds. To provide this power special pulsed power generators 17 are used, for example as illustrated for the University of Nevada, Reno, Zebra Facility shown in FIG. 14. Although the size of the Zebra Facility is large as shown in this illustration, in practice the pulse generator 17 can be engineered to be smaller than this by a considerable factor.

Our experiments, theory, and computations are self-consistent and agree well on the key dynamical features of the staged Z-pinch, for producing fusion, which may be characterized or visualized as follows. As the plasma liner implodes, the plasma is initially heated by Ohmic dissipation, followed by the formation of a shock front that detaches from the bulk of the slower-moving liner plasma. The shock collides with the outer surface of the low-mass, target plasma, accelerating the target inward. The shock is partially transmitted and reflected at the interface. The shock speed in the target plasma is much larger than it is for the liner, thus, the shock transit time in the target is short and the plasma is rapidly heated. Adiabatic compression and current amplification follow, as the bulk of the liner mass converges to the axis compressing the plasma to fusion conditions. On the onset of fusion reactions, the charged particles produced will be trapped by the large magnetic field surrounding the target plasma and will deposit their energy into further heating of the plasma. Depending upon the optimization of different parameters the "ignition" will set up resulting into the production of very large nuclear energy.

Optimization parameters include, but are not limited to: the initial radii of the liner and target, their respective thicknesses, their linear mass distributions, all adjusted to preserve maximum hydrodynamic compression and energy production consistent with the current and rise time of the pulsed-electrical generator 17. The quantity of fusion energy produced can be much larger than what was used to produce the reaction in the first place, and expressed in technical terms can have an energy gain (amplification) of 50-100. To date, the fusion community has yet to produce a reaction that comes close to an energy gain of 1.

Producing a fusion energy gain greater than 1 from a staged Z pinch is predicted in the simulation disclosed below for a limited set of pulsed-electrical driver and plasma load parameters, using sophisticated plasma-fluid-dynamic simulation codes, such as the MACHX code (R. E. Peterkin, M. H. Frese, and C. R. Sovinec. Transport of magnetic flux in an arbitrary coordinate ale code. Journal of Computational Physics, 140(1):148-171, 1998), and material equation of state tables, such as the SESAME tables available from Los Alamos National Laboratories (http://t1web.lanl.gov/new-web_dir/t1sesame.html). Other plasma codes exist that may provide similar insights into the production of net fusion energy from a staged Z pinch. However, the specific configuration of a staged Z-pinch, that is a high atomic number liner and low-atomic number target, leading to the mechanism whereby the pulsed-electrical driver current and voltage are coupled into the plasma load in discrete energy transfer stages, of progressively shorter timescales, is principally important for the illustrated embodiment of the present invention.

Figure 12:
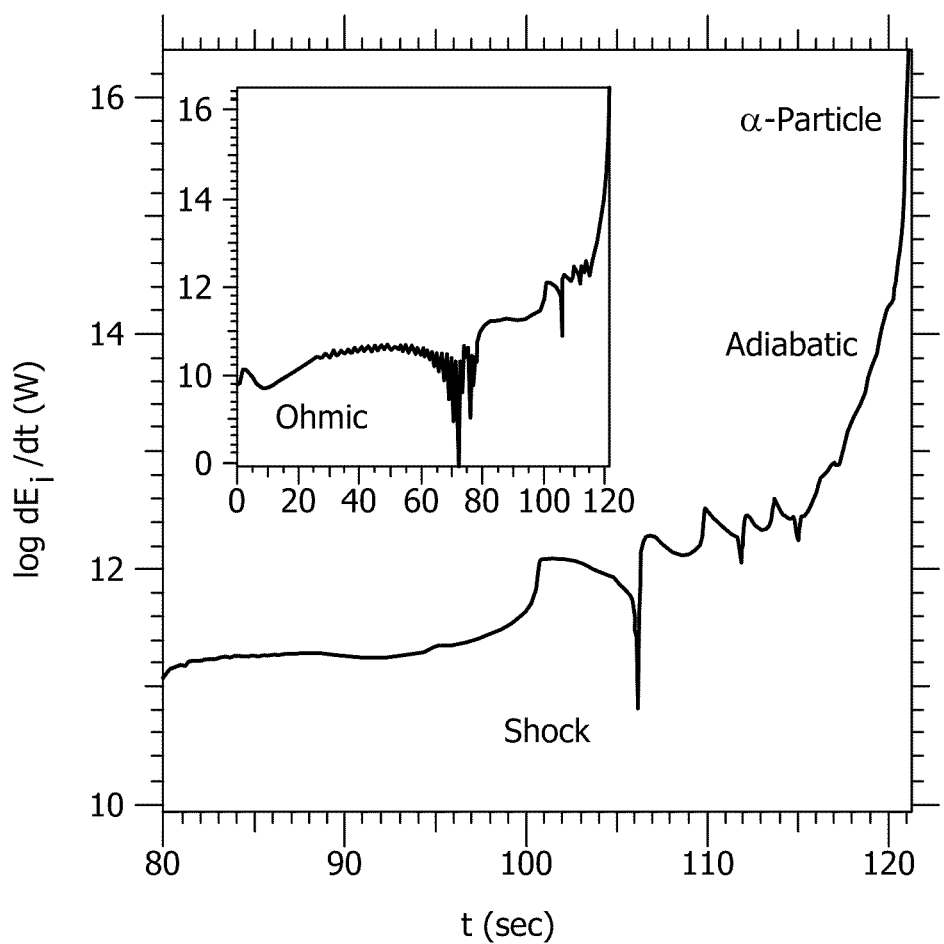
FIG. 12 is a graph of ion-thermal energy, $E_i$, plotted as a function of time showing the stages of contribution during the staged Z-pinch, namely Ohmic heating, shock heating, adiabatic heating and a particle heating.

The embodiment of the energy staging mechanism is illustrated in FIG. 12. Initially the plasma is heated ohmically, then subsequently by shock heating, adiabatic heating, and finally alpha-particle heating, each with a progressively smaller duration in time and correspondingly higher ion heating power. Over this complete cycle it is critical to preserve the stability of the plasma column. This is dynamically achieved by the specific selection of a co-axial liner and target plasma and by keeping the implosion cycle time smaller than the time that can cause major disruption due to instabilities. Shocks that arise in the second cycle help to control instability growth by shock-stabilization. (N.

Rostoker and H. Tahsiri. Rayleigh Taylor Instability for Impulsively Accelerated Shells; A perspective of Physics. Gordon and Breech, NY, Sir Rudolph Peierls, Ed., 1978.)

A better appreciation of the foregoing features can be obtained by turning now to a detailed consideration of a simulated staged Z pinch according the illustrated embodiments. Consider first the growth of the Rayleigh-Taylor instability. A typical Z-pinch is Rayleigh-Taylor unstable during implosion, since the implosion involves a light fluid (the magnetic field) accelerating a heavy fluid (the plasma). In the linear-regime of analytic modeling, plasma perturbations grow as $$\xi = \xi_0 e^{\gamma t} \qquad (1)$$

where $\xi_0$ is the initial perturbation, $\gamma=(gk)^{1/2}$ is the growth rate, g is the acceleration, k is the wave-number, and t is the time. Approximating the distance, R, over which the Z-pinch plasma is accelerated, $R=gt^2/2$, Eqn. 1 may be re-written as, $$\xi = \xi_0 e^{\sqrt{2Rk}} \qquad (2)$$

and for a given mode number the perturbation growth depends exponentially on the distance over which the plasma is accelerated. Hence, staged Z pinch implosions from a small initial radius are preferred.

The accumulated Z-pinch energy (in Gaussian units) can be estimated roughly as the work done on the pinch, $$W = \int \vec{F} \cdot d\vec{r} = \frac{I^2 h}{c^2} \ln[R_i/R_f] \qquad (3)$$

where I is the current, h is the axial length of the pinch, $R_i$ is the initial radius, and $R_f$ is the final radius of the pinch. Thus, high current and a large radius implosions are preferred. The combined implications of Eqns. 2 & 3 are that the radius must be chosen judiciously to avoid instability, while accumulating high energy in the pinch.

Turn now to computed simulations of the staged Z-pinch 10 diagrammatically depicted in FIG. 1. The simulated staged Z-pinch load configuration 10 in the illustrated embodiment is a 1.5-cm long, 0.2-cm thick xenon plasma liner 12 imploding onto a DT target 14, as shown in FIG. 1. The initial Xe mass distribution of liner 12 is Gaussian and the DT target 14 is uniformly-filled. The "cold-start" initial plasma temperature is 2 eV, for both the Xe and DT. The implosion dynamics are simulated with MACH2, which is a single-fluid, magnetohydrodynamic, 2½ dimensional, time-dependent code, that treats the electron, ion, and radiation temperatures separately and calculates resistive and thermal diffusion using established transport models. The plasma equation-of-state is determined from conventional SESAME look-up tables (http://t1web.lanl.gov/doc/SESAME_3Ddatabase_1992.html). The Xe calculation uses the SESAME tables for thermal conductivity and electrical resistivity. A Spitzer model is used for the DT thermal conductivity and electrical resistivity, since this data is not readily available in the SESAME tables.

MACH2 calculates flux-limited, single-group, implicit-radiation diffusion. Ohm's Law includes the Hall Effect and thermal-source terms for magnetic fields. The plasma volume was resolved into 160 radial cells and 120 axial cells for two dimensional simulations; sufficient to model axial-instability wavelengths as small as 0.3 mm. A random seed perturbation of 0.01 (1%) was applied throughout the simulation volume. This seed value is arbitrary, yet is typical for plasma liner simulations of this type. For comparison, a value of 25% is typically used for wire array simulations. The MACH2 code includes a self-consistent circuit model for the pulse-power driver parameters (inductance, capacitance, and resistance) and the dynamically-computed pinch-plasma parameters (inductance and resistance). For the simulation of the illustrated embodiment the assumed short-circuit discharge parameters, resistance, inductance, capacitance, and charging voltage were: R=0, L=10 nH and C=0.35 μF, and $V_0$=3.4 MV. The capacitor-stored energy is, ½ $CV^2_0$=2 MJ and the current-pulse rise time is, $\tau_{1/4} \approx 95$ ns. The discharge electrodes are assumed to be perfectly conducting.

Figure 2:
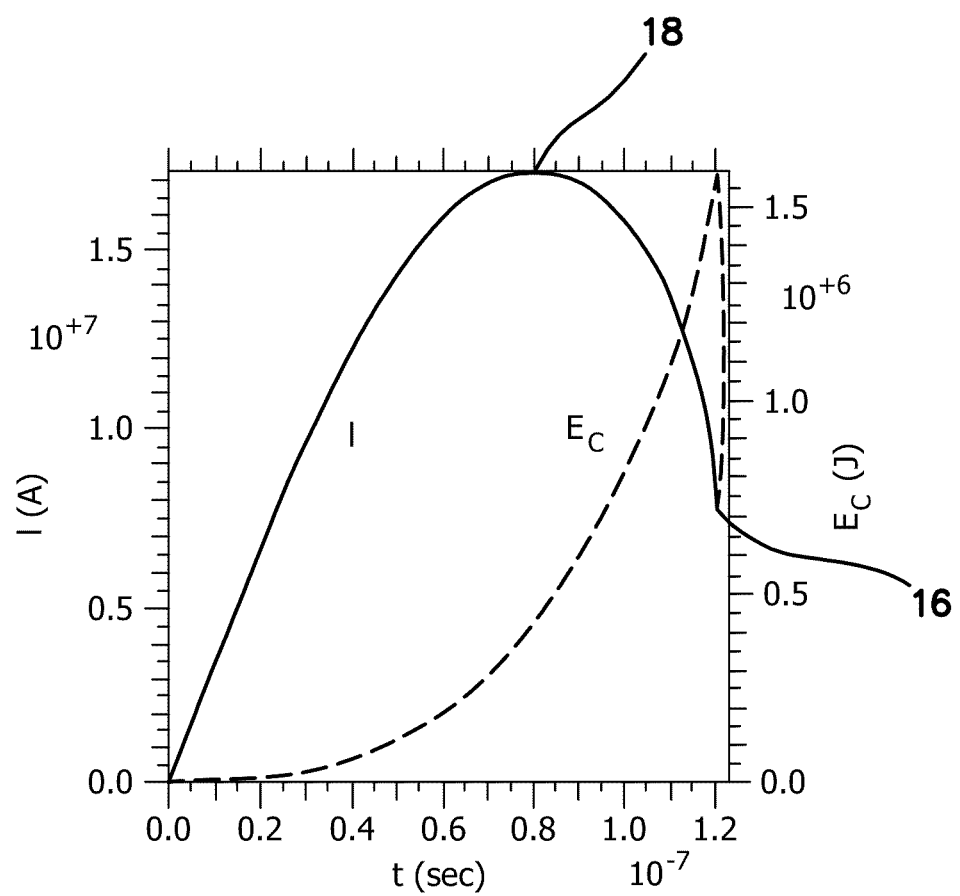
FIG. 2 is a graph of the load current, I, and the extracted circuit energy, Ec, for the 0.5 cm radius pinch.

MACH2 was run first in a one dimensional mode, for a fixed pinch-implosion time of 121 ns, to determine the load masses, M, needed to implode from the following initial radii: $R_i$=2.0, 1.5, 1.0, and 0.5 cm. For zero dimensional modeling this is equivalent to keeping $MR^2_i$=constant for a given current profile. These one dimensional mass parameters were then used as inputs for the two dimensional simulations. The respective mass densities for Xe (order of decreasing radius, 2.0-0.5 cm) were: $\rho_{Xe}$=1.3×10$^{-3}$, 4.2×10$^{-3}$, 1.7×10$^{-2}$, and 0.18 gm/cm$^3$. The respective mass densities for DT were: $\rho_{DT}$=9.4×10$^{-5}$, 5.5×10$^{-5}$, 47.8×10$^{-5}$ and 3.4×10$^{-3}$ gm/cm$^3$. Note that the total mass of the DT is orders of magnitude smaller than for the Xe. FIG. 2 plots the load-current time-profile, $I_{load}$, for the 0.5-cm radius case. A peak current of $I_{load}$=17 MA is obtained in 80 ns. After the peak 18 the slope of the $I_{load}$ waveform changes dramatically, due to the large increase in inductance caused by the decreasing radius of the pinch, since $L_{pinch}(t)=\mu_0/2\pi$ In [$R_{out}/R_{pinch}(t)$], where $R_{out}$ is the radius of the return-current boundary path and $R_{pinch}(t)$ is the time-dependent pinch radius. Maximum compression of the staged Z-pinch occurs at 121.17 ns at time 16 in FIG. 2, when the discharge current is approximately $I_{load} \approx 8$ MA. After this time the pinch radius expands and the discharge current rebounds. This time-dependent behavior of the current pulse is typical for all pinch radii that were simulated.

The time-profile for the total energy extracted from the circuit, Ec, is also displayed in FIG. 2, where Ec=$E_{radiation}$+$E_{transport}$+$E_{kinetic}$+$E_{thermal}$+$E_{inductive}$, that is the sum of the energy lost by dissipation (through radiation and transport), pinch energy (kinetic and thermal), and system energy (inductive magnetic). As illustrated Ec continues to increase until the moment of peak compression at time 16, reaching a peak value of, Ec=1.6 MJ. The balance of the initial-stored energy at this time remains in the circuit capacitance and is equal to 0.4 MJ. After peak compression Ec decreases rapidly, indicating, as discussed below, that energy is added back into the circuit as the pinch explodes due to the onset of fusion.

FIGS. 3a-3d compare graphically the level of instability computed at 100 ns, as a function of the initial-pinch radius. Shown in FIGS. 3a-3d are two dimensional plots of the pinch-current density. In these illustrations the R axis is horizontal and Z axis is vertical and the scale units are cm. In qualitative agreement with Eqn. 2, the level of instability is greatest for the largest initial radius in FIG. 3a and smallest for the smallest initial radius in FIG. 3d. For the 2.0 cm initial-radius simulation of FIG. 3a the calculation terminates at 101 ns, as the pinch becomes unstable and the discharge-current path is broken. The result is similar for the 1.5 cm initial-radius simulation in FIG. 3b, which terminates at 102 ns. For both the simulated neutron yield was insignificant. For the 1.0-cm radius simulation of FIG. 3c shows that the liner's outer surface is slightly unstable. At the inner-radius edge of the liner is a stable detached-current layer, illustrating how a multi-liner cascade can improve stability. The 1.0 cm simulation of FIG. 3c terminated at 115 ns, due to instability and the neutron yield was Y=2.7×10$^{13}$. The 0.5 cm radius implosion of FIG. 3d provides the best stability. At this time both the liner and target surfaces remain stable. The detached-current layer, evident in FIG. 3d, has broadened for this radius and is located at the outer surface of the DT target 14.

Figure 4:
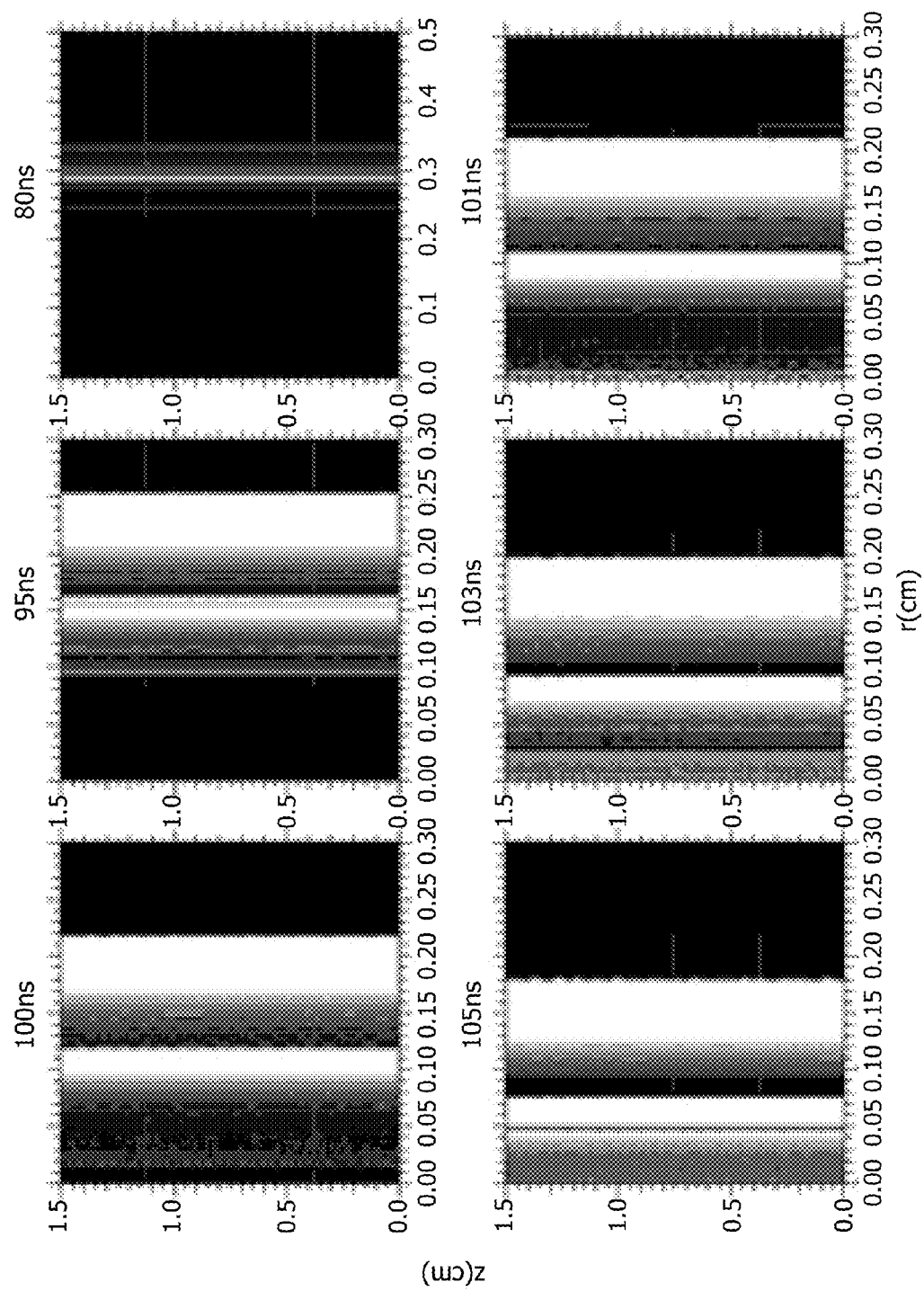
FIG. 4 is a series of time panels of the two dimensional R-Z profiles of axial current density for a 0.5 cm initial radius staged Z-pinch chamber.
Figure 4:
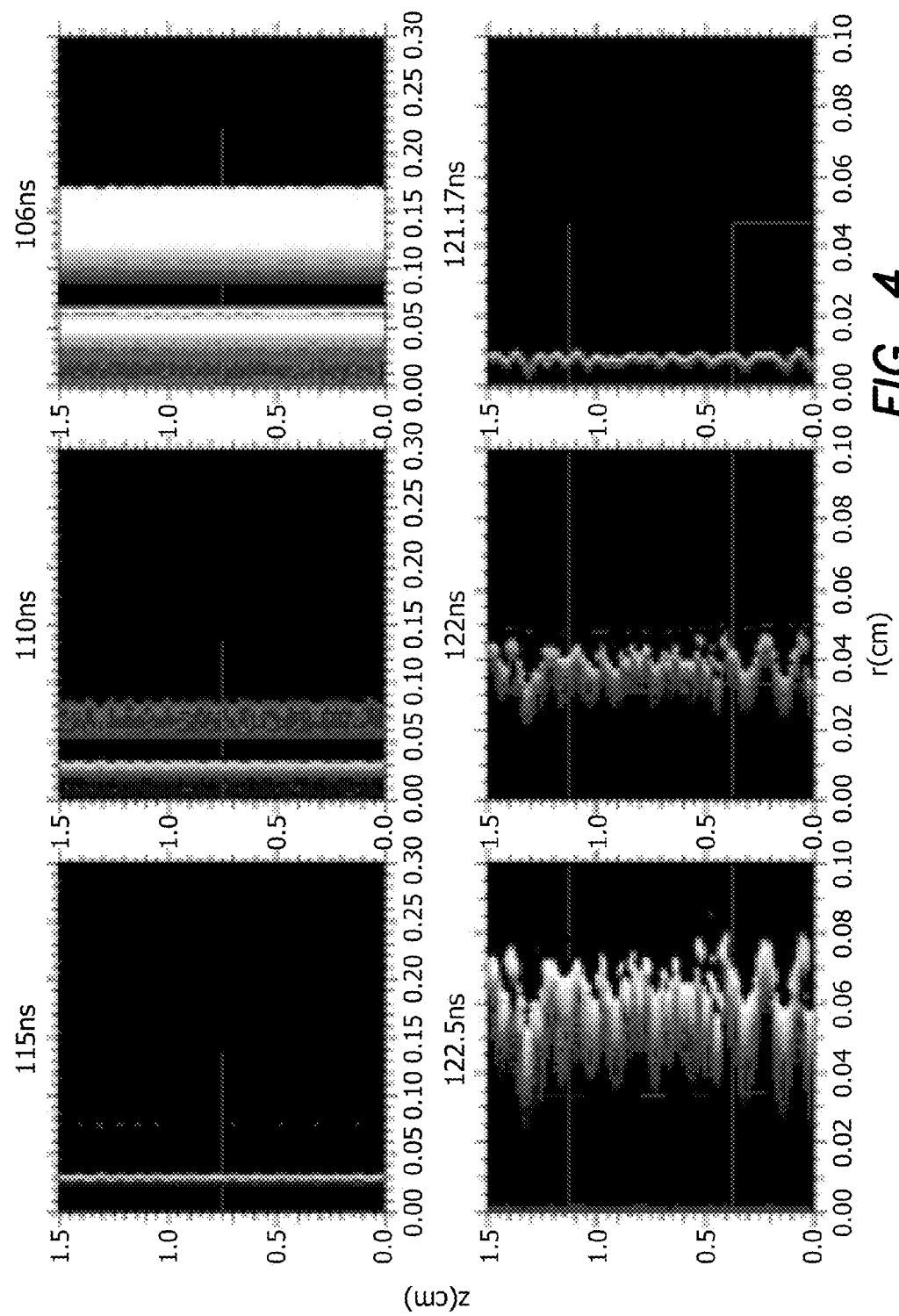

Turn now and examine the 0.5-cm radius case of FIG. 3d in more detail. FIG. 4 displays a time-sequence of two dimensional (iso-contour) discharge-current density images for the 0.5-cm radius implosion, beginning at 80 ns in the top right corner of the figure and progressing to 122.5 ns in the bottom left corner of the figure, just after peak-compression at time 16 of the pinch, which occurs at 121.17 ns. Note the radial scales in subsequent images: the radial range is largest for the 80 ns panel and shortest for the last three panels on the bottom row (121.17, 122, and 122.5 ns). These images extend in time that shown in FIG. 3d, illustrating the stability of the 0.5-cm radius implosion up to peak compression at time 16, when the RT instability develops rapidly and within a couple of ns, the pinch disassembles. The RT instability at the DT surface is due to deceleration of the liner 12 against the internal pressure of the target plasma 14 and then subsequent expansion outward as the target plasma 14 explodes.

Figure 5:
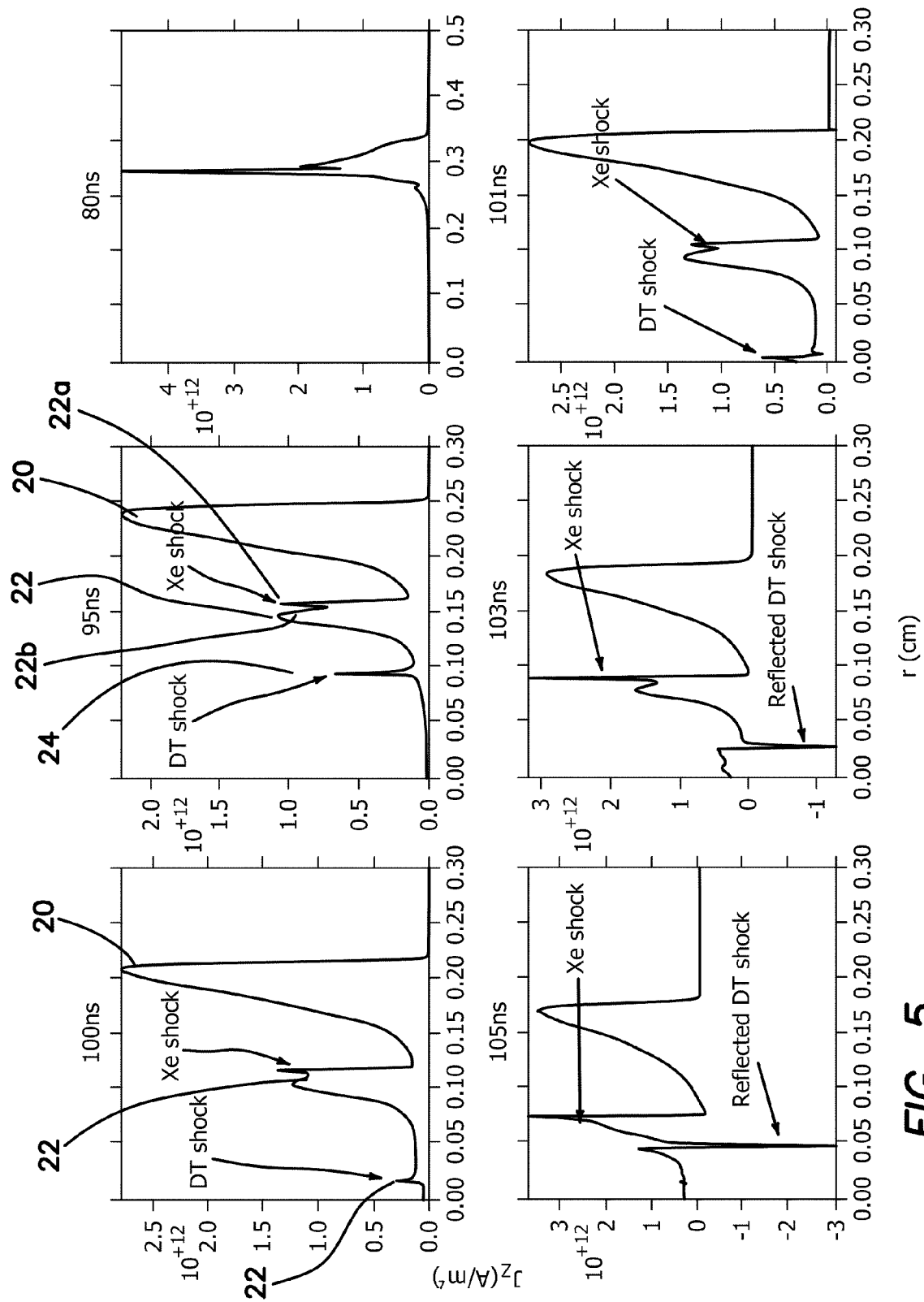
FIG. 5 is a series of time panels corresponding to those of FIG. 4 in which the axial current density averaged over the axial direction is shown.
Figure 5:
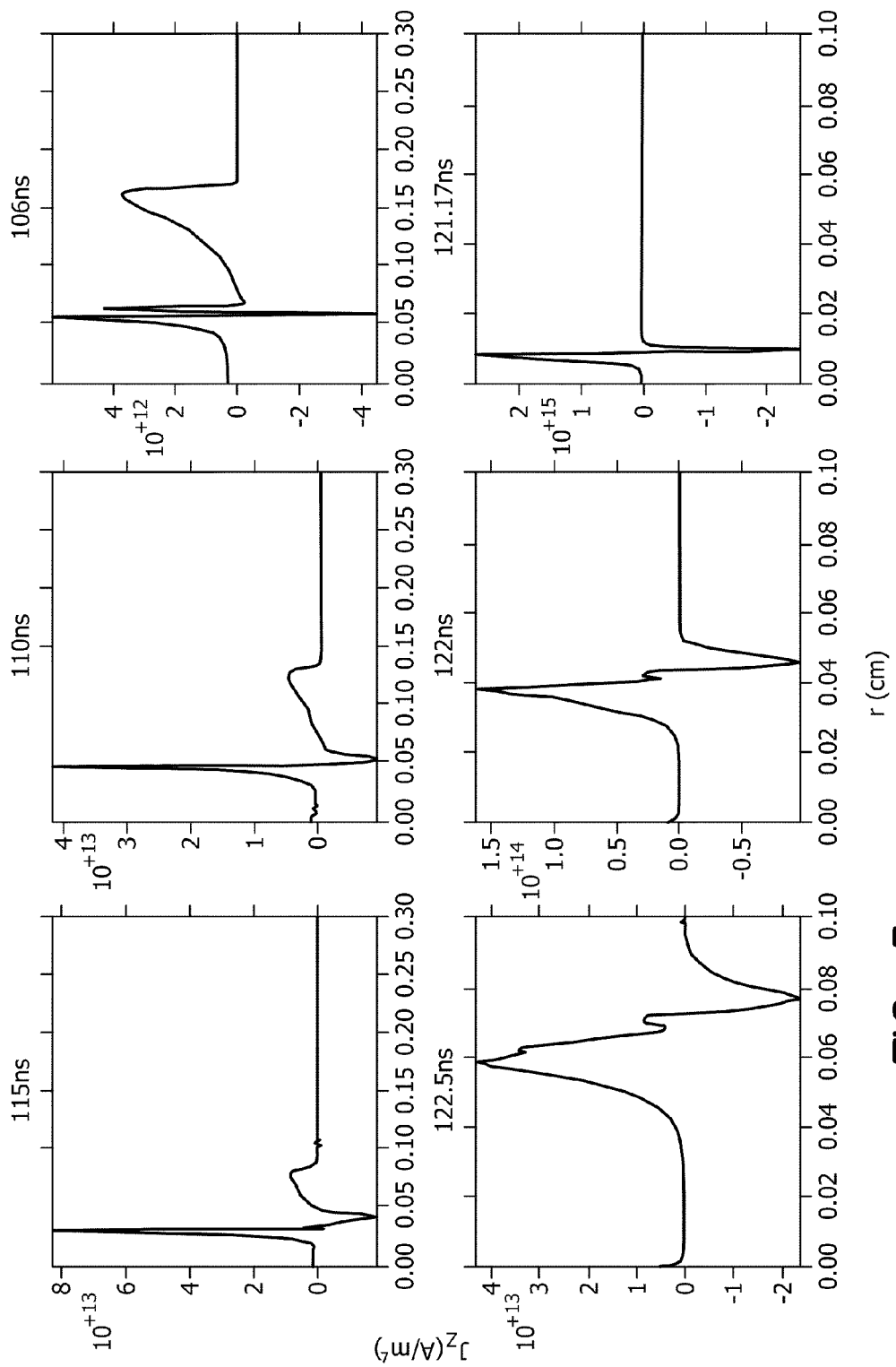

An axial average of the data in FIG. 4 is also displayed as corresponding line-plots in FIG. 5. At 80 ns depicted in the top right of FIG. 5 the outer radius of the pinch is at 0.34 cm, having imploded from its initial value of 0.5 cm. At this time the current density is concentrated in a narrow sheath or cylindrical shell between 0.28 cm and 0.29 cm inside the DT 14 and a more diffuse layer distributed between 0.3 cm and 0.34 cm radius inside the Xe liner 12. Until peak compression the value of the current density at the outer surface of the Xe liner 12 remains at a nominal value of, $J_z$=3–5×10$^{12}$ A/m$^2$ accelerating the outer surface of the Xe liner 12, by the $J_z \times B_\theta$ force. As time progresses, the current density is transported into the DT interior 14 by Xe or DT shocks, as labeled in the panels of FIG. 5. Shocks develop when the liner temperature remains low and its density high. The specific choice of Xe, as a high Z liner material, enhances the generation of shocks, by radiative cooling. At 95 ns, when the outer radius of the pinch has decreased to 0.25 cm, there are three layers of high current density, namely an outer layer 20 between 0.2 cm and 0.25 cm radius, a thinner layer 22 between 0.12 cm and 0.15 cm, and a third layer 24 at 0.09 cm. The Xe shock 22 is characterized by a spike 22a in $J_z$ that is located at the Xe-DT interface and a more diffuse region 22b extending into the DT. A second shock 24 is present inside the DT that is generated when the Xe shock 22 collides with the outer surface of the DT 14. As time increases the DT shock 24 converges to the axis and reflects as shown in the 103 ns panel. The outwardly propagating current layer splits into layers of positive and negative current density with the reflected DT shock 24. As the shocked layer expands outward, a self-consistent current loop is established inside the pinch that supports flux compression.

The amplitude of the negative-current-density layer continues to grow as the liner 12 implodes. At 121.17 ns the positive and negative current densities have approximately equal values of 2.6×10$^{15}$ A/m$^2$. The radius of the inner layer is 0.006 cm and the radius of the outer layer is 0.011 cm. Until this time the magnitude and thickness of the current density at the outer surface of the Xe liner 12 remains relatively constant, when it begins to diminish and the implosion continues to be driven largely by liner inertia.

Throughout the implosion there is a complicated evolution and interplay of the current density layers and their magnitudes as displayed in FIG. 5. Even though the current densities are comparable in magnitude until peak compression at time 16, the current-layer thicknesses are unequal. Integrating $J_z$ as a function of radius, confirms the presence of the current loop. Near peak compression the magnitude of this loop current is, $I_{loop}$≈25-30 MA, while the total circuit current remains as indicated in FIG. 2. The inductance of this current loop is approximately 0.7 nH, with an equivalent inductive energy of 0.2-0.3 MJ.

Examination of the corresponding azimuthal-magnetic field, $B_\theta$, provides further insight into the implosion dynamics. At 115 ns, in FIG. 6, $B_\theta$ attains a peak value of about 27 MG at radius 26 the outer surface of the liner 12, whereas at the radius 28 of the surface of the DT 14, $B_\theta$ has a peak value of 44 MG. It is this larger magnetic field, located at the target surface, that is due to flux compression, driven by the inertial pressure of the liner 12. At 121.17 ns $B_\theta$ attains a peak value of 560 MG. At 122 ns the value of $B_\theta$ has decreased to 100 MG as the pinch re-expands.

Figure 6:
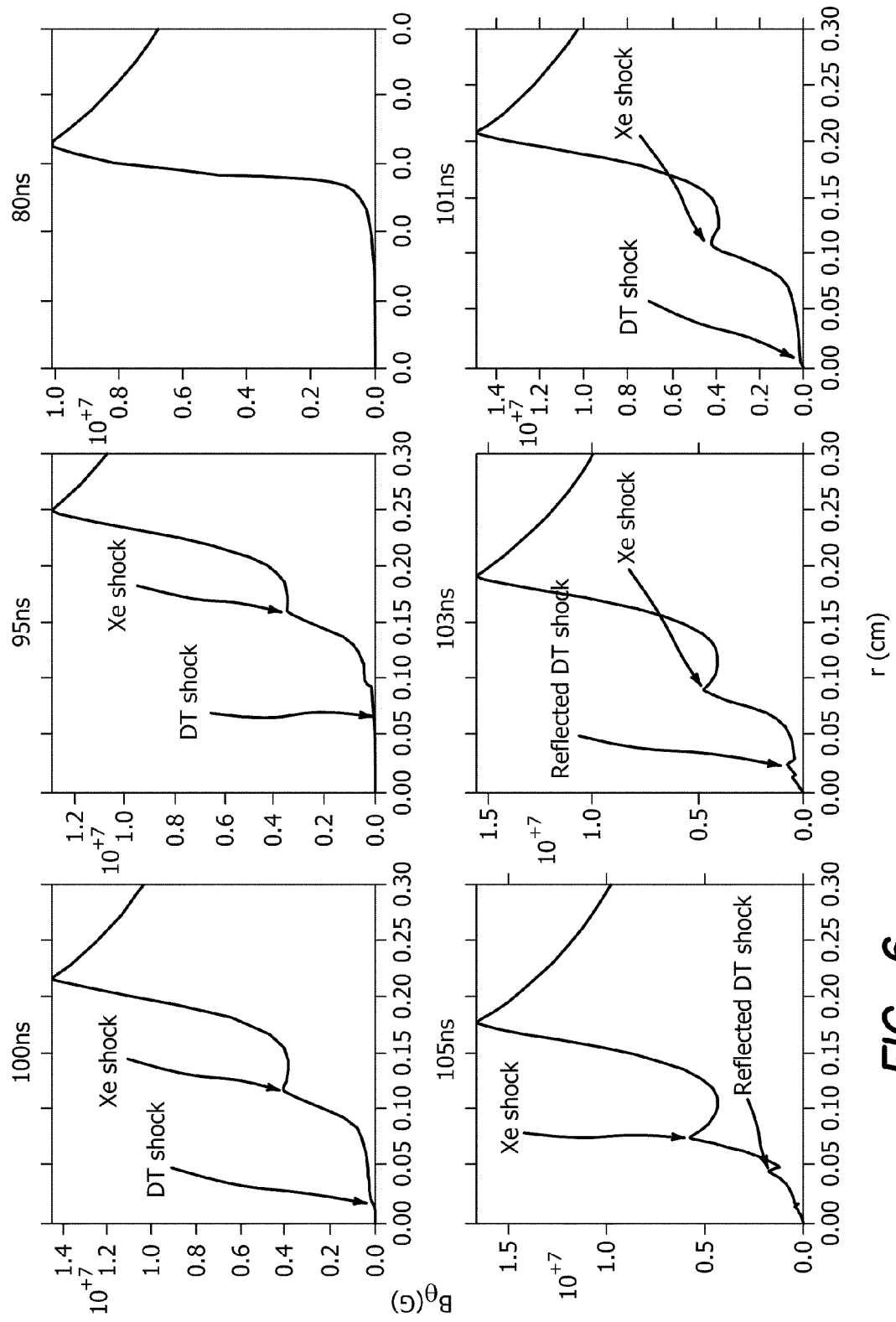
FIG. 6 is a series of time panels corresponding to those of FIGS. 4 and 5 in which the azimuthal magnetic field averaged over the axial direction is shown.
Figure 6:
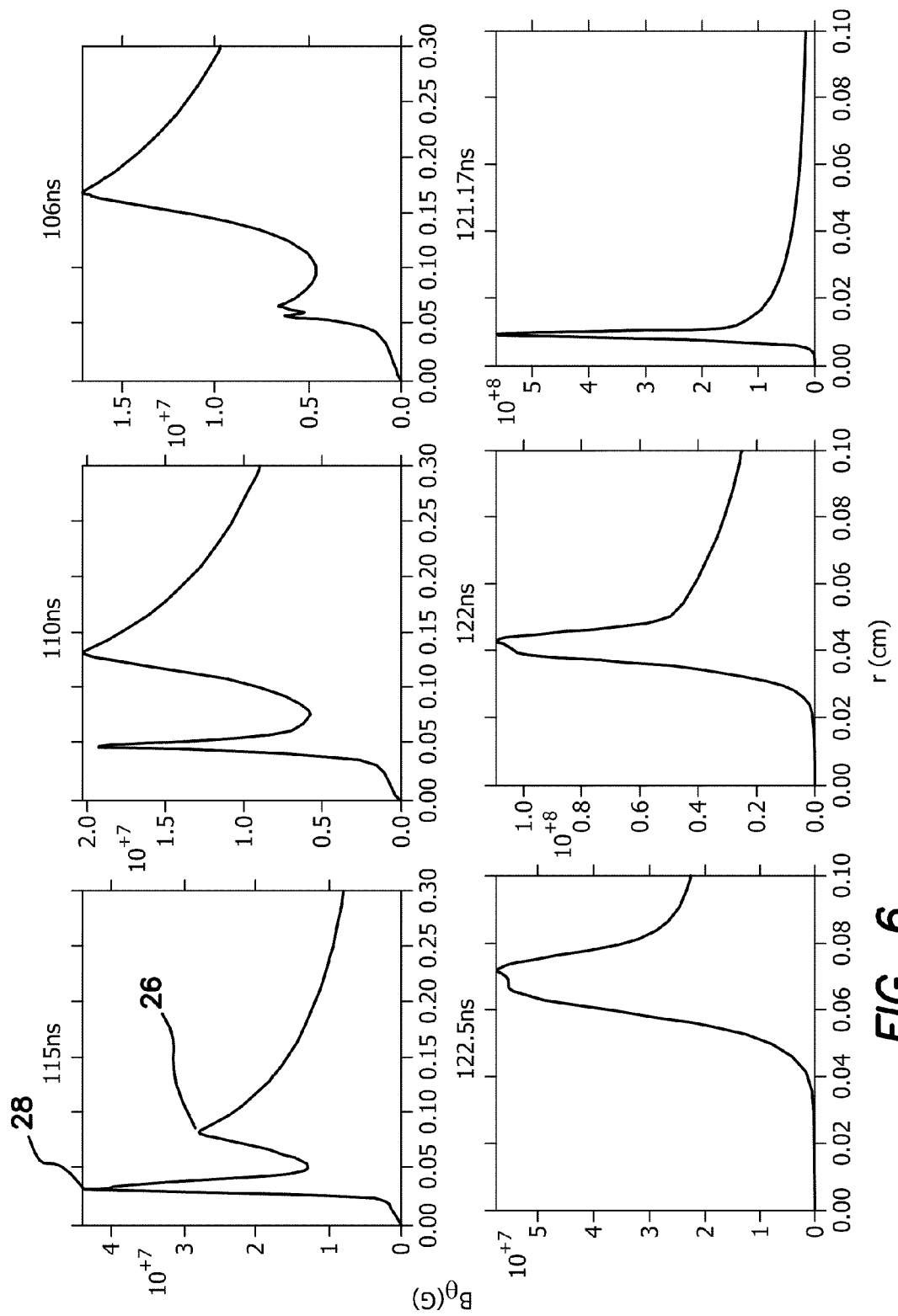
Figure 7:
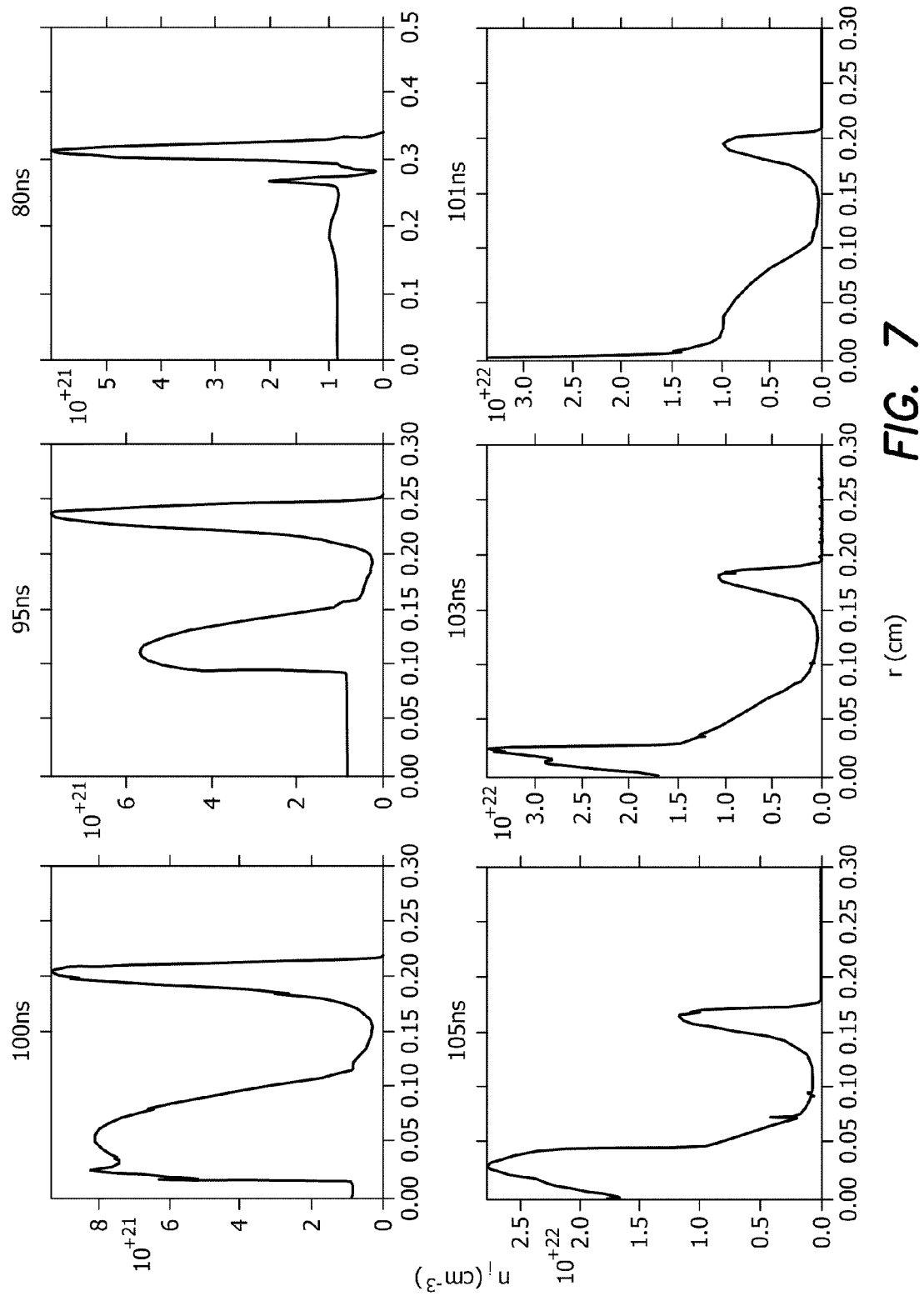
FIG. 7 is a series of time panels corresponding to those of FIGS. 4-6 in which the ion density averaged over the axial direction is shown.
Figure 7:
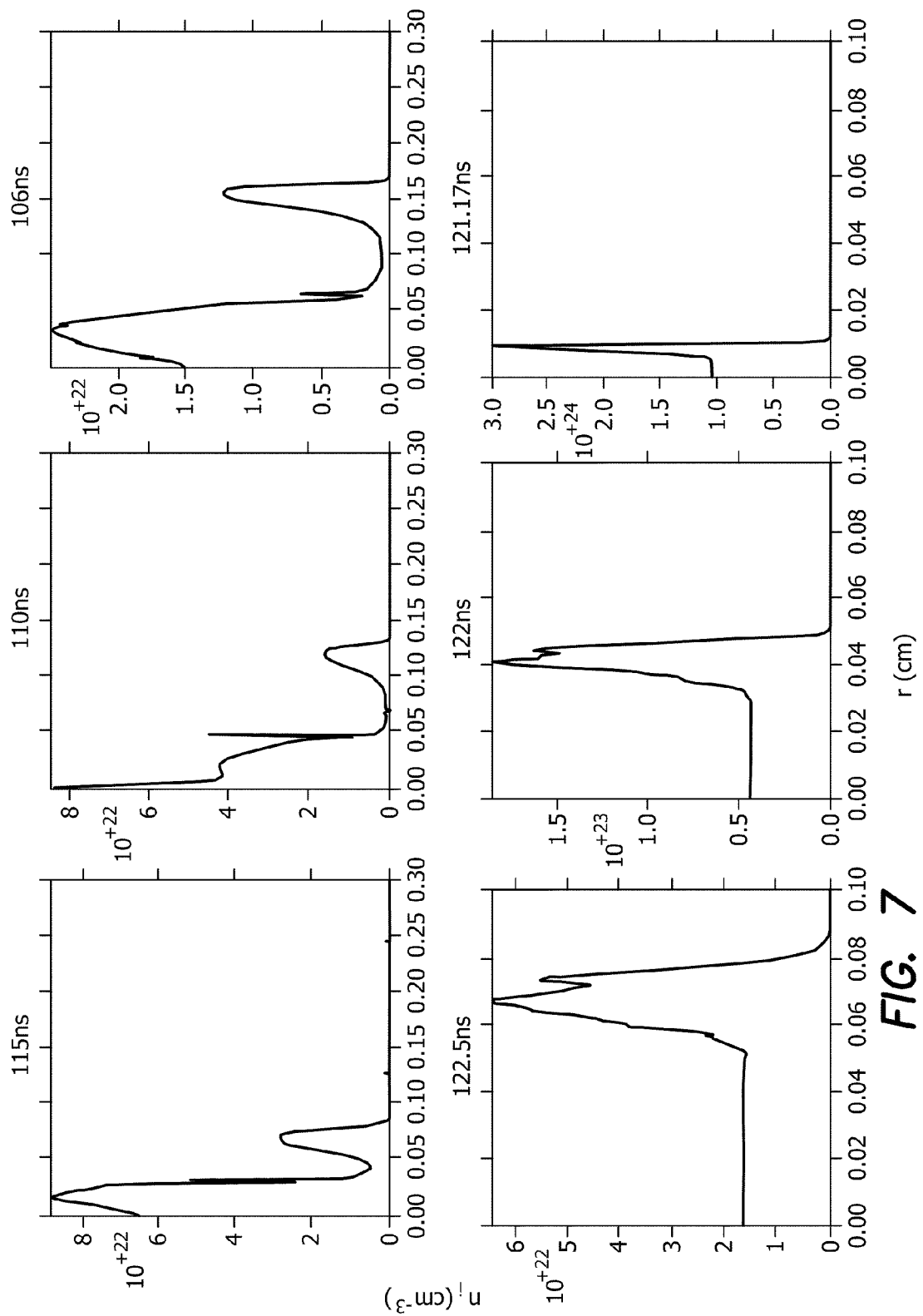
Figure 8:
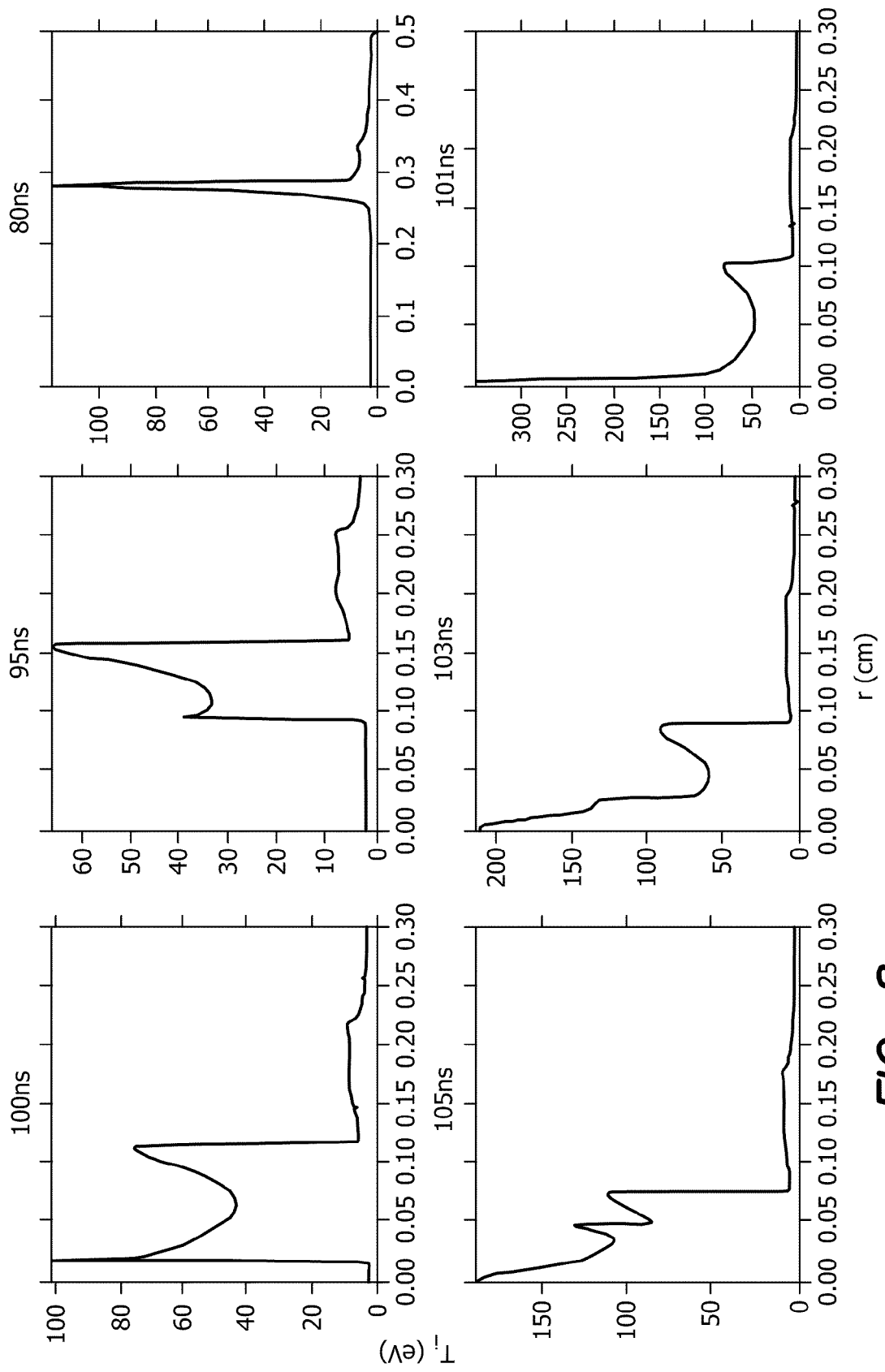
FIG. 8 is a series of time panels corresponding to those of FIGS. 4-7 in which the ion temperature averaged over the axial direction is shown.
Figure 8:
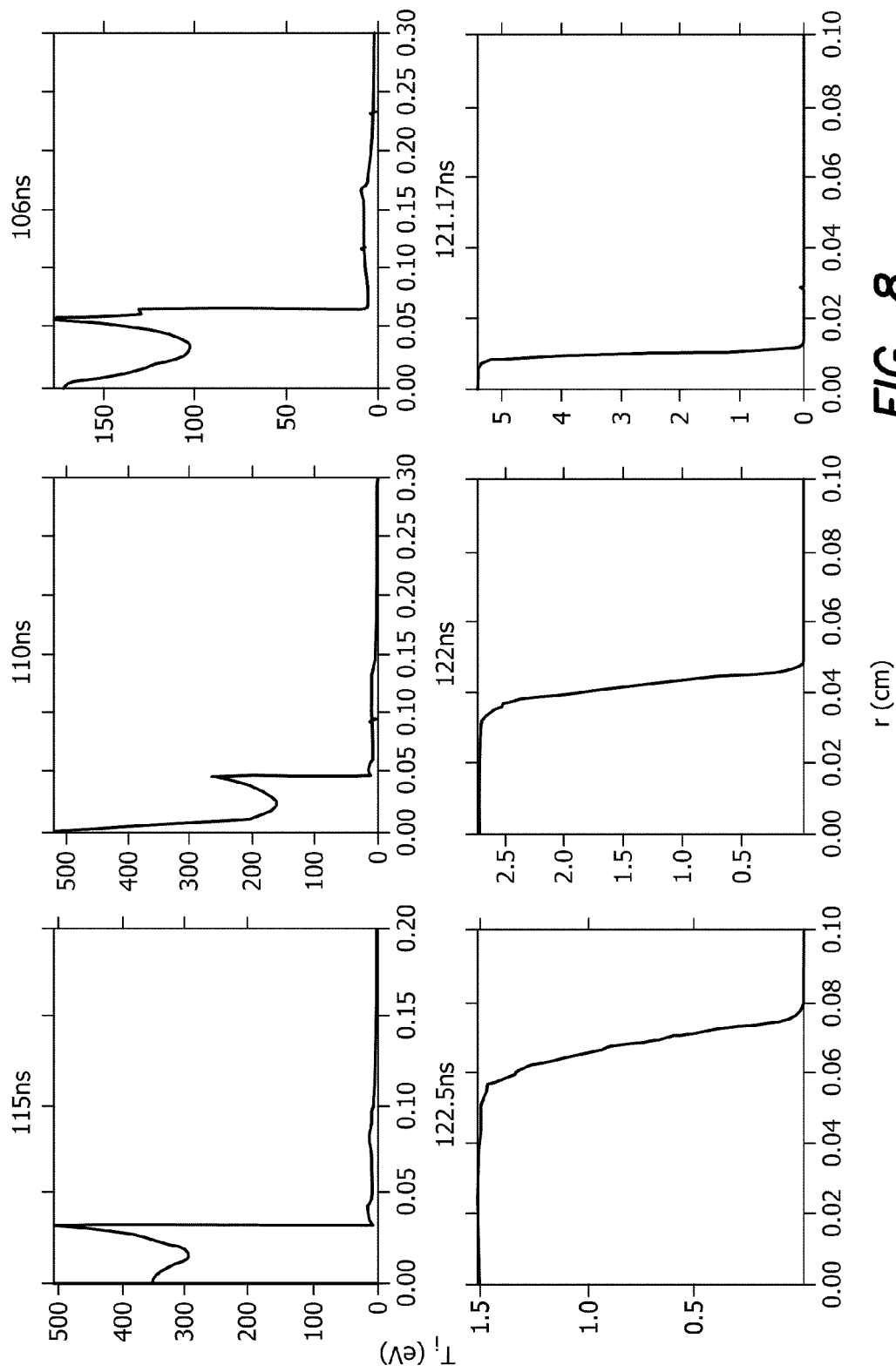

The ion density, $n_i$, averaged over the axial direction is shown in FIG. 7 as a function of radial position and temperature, $T_i$, averaged over the axial direction is shown in FIG. 8 as a function of radial position for the time panels corresponding to FIGS. 5 and 6. For all time steps the electron and ion temperatures remain in thermal equilibrium, until the moment of peak compression at time 16, when the fusion α particles heat the ions more rapidly than the electrons. The 80 ns panels show a sharp transition in density and temperature near 0.3 cm radius, with $n_i$≈6×10$^{21}$ cm$^{-3}$ and $T_i$≈115 eV. Notice that the peak density and temperature do not coincide, as the higher temperature peak and lower density corresponds to the shocked DT 14, whereas the higher density peak and lower temperature corresponds to the radiatively cooled Xe liner 12. As time increases shocks continue to propagate in the DT 14 are reflected and the density and temperature values oscillate. By 115 ns the nominal density and temperature of the DT 14 has reached, $n_i$=8×10$^{22}$ cm$^{-3}$, and $T_i$=400 eV. At peak compression at 121.17 ns, the peak ion density in the DT 14 is, $n_i$=10$^{24}$ cm$^{-3}$, and the temperature is, $T_i$=54 keV, whereas the peak ion density in the Xe liner 12 is three times higher at, $n_i$=3×10$^{24}$ cm$^{-3}$, and the temperature is much lower. The large increase in temperature at this time is attributed to ion heating by the fusion α particles, as will be discussed shortly.

These density and temperature values in the DT 14 are sufficient for fusion to occur. Based on the Lawson criterion, $n\tau$>10$^{14}$ cm$^{-3}$-s, a confinement time of τ=30 ps is needed for fusion to begin, which is well satisfied.

Shocks play a key role in the staged Z-pinch, pre-compressing target plasma prior to the onset of fusion. In the present case the DT 14 is compressed from 0.3 cm radius to a final radius of 0.005 cm, that is a factor of 60, c.f., FIGS. 7 and 8, producing a temperature increase from 2 eV to 60 keV.

To achieve the same temperature increase in the DT 14 without shock heating, that is by adiabatic compression alone, the radial compression ratio of the DT 14 would need to be much higher. For adiabatic compression the initial and final plasma temperatures are related to the initial and final radii by, $T_f=T_i(R_i/R_f)^{2(\gamma-1)}$, where $\gamma=5/3$ is the ratio of specific heats for DT 14. Hence, to achieve the same temperature increase noted above, the compression ratio would need to be, $R_i/R_f \approx 2.5 \times 10^3$. Thus, shock heating is a important component in preparing the DT target 14 for fusion conditions.

Figure 9:
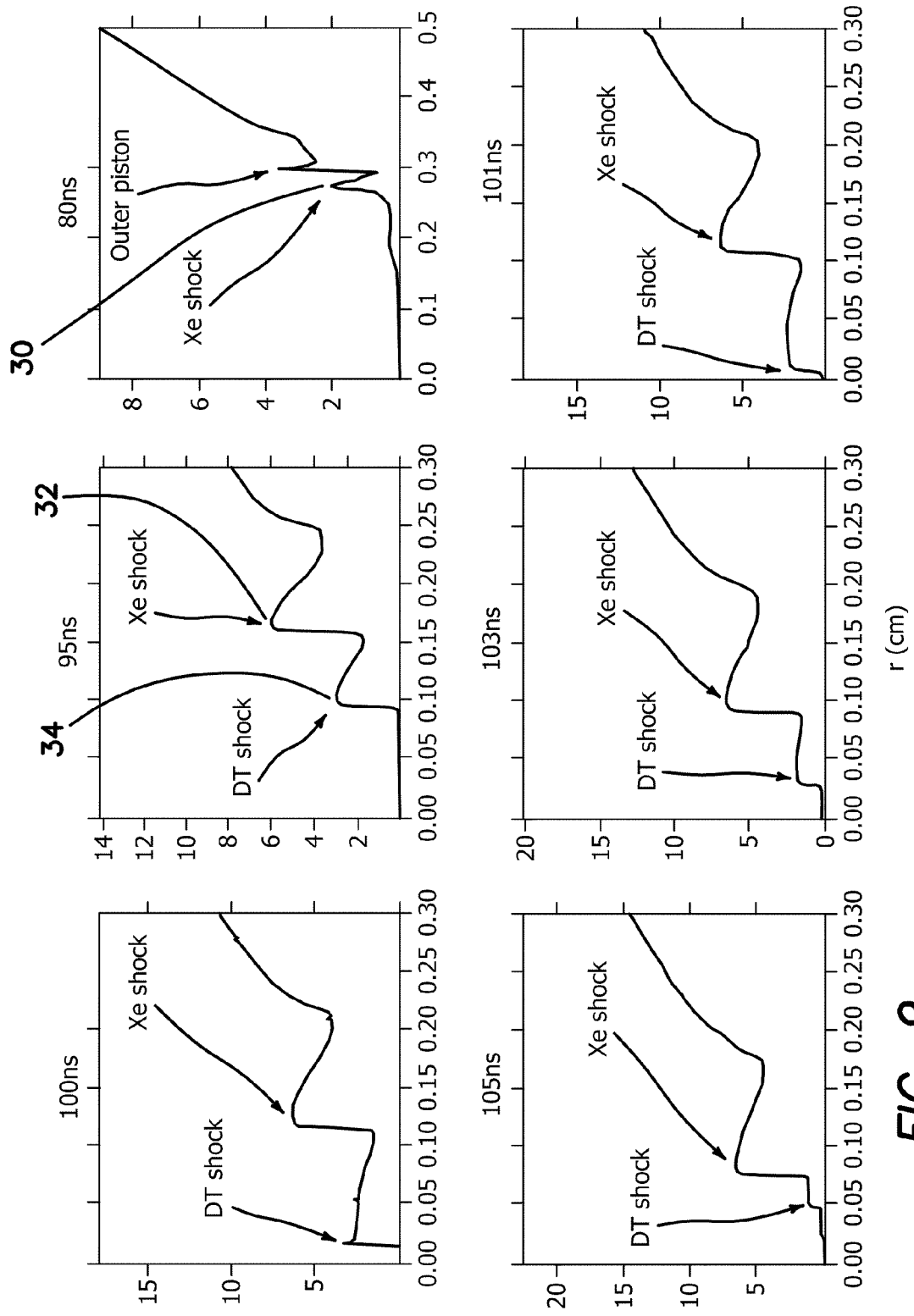
FIG. 9 is a series of time panels corresponding to those of FIGS. 4-8 in which the "line-outs" of Mach number averaged over the axial direction is shown.
Figure 9:
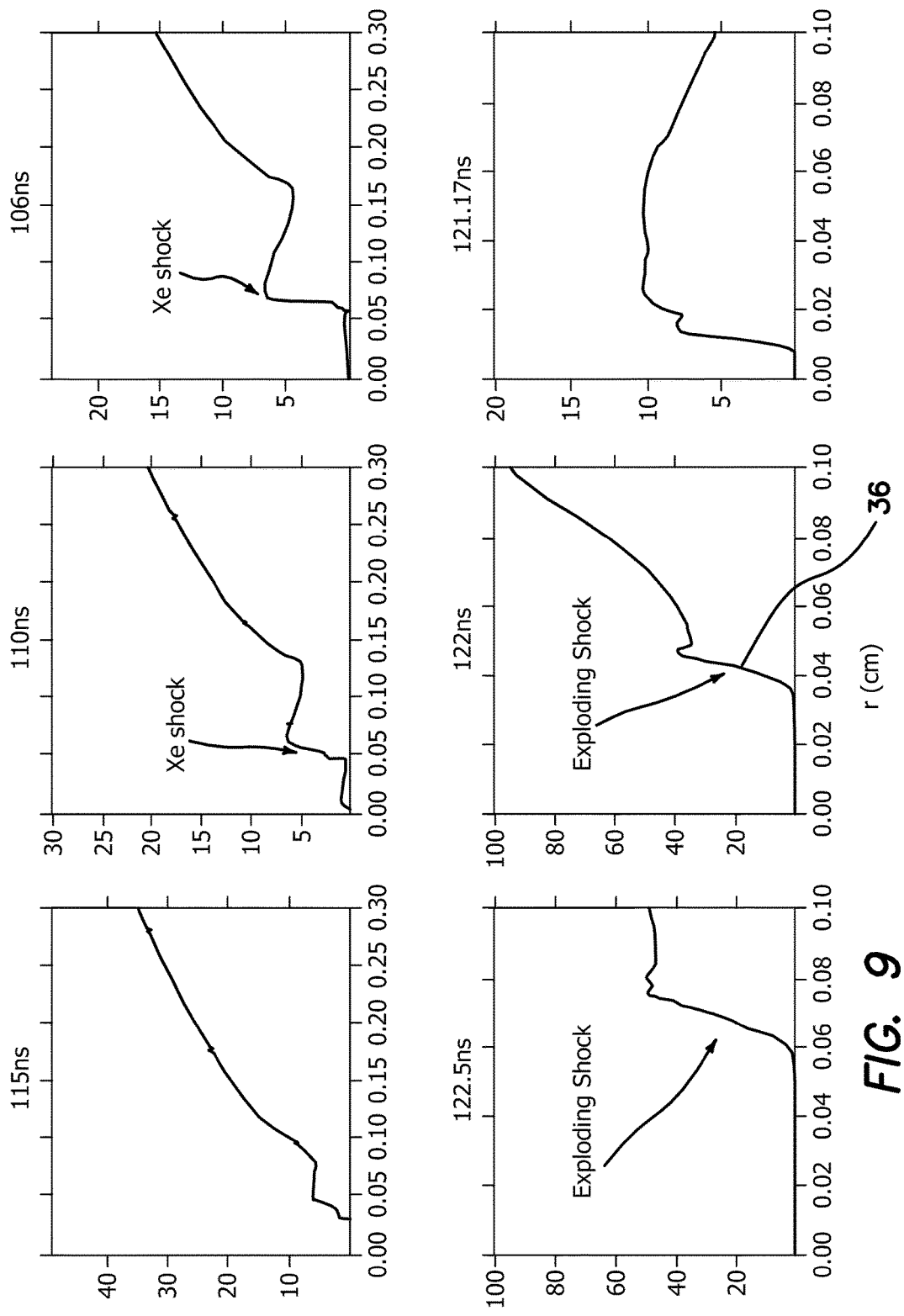

Consider the Mach number, $M=V_r/C_s$, where $V_r$ is the radial implosion velocity and $C_s^2 = \delta P/\delta \rho$ is the sound speed, P is the pressure and $\rho$ is the density. The Mach number averaged over the axis was calculated at each simulation-grid point based on the above equation and displayed in the corresponding time panels of FIG. 9. At 80 ns a Mach 2.2 shock 30 is present at 0.27 cm radius, just inside the DT 14. At 95 ns, when $V_r=4$ cm/µs, two shocks 32 and 34 are clearly evident: one shock 32 located at the Xe-DT interface and another 34 located inside the DT 14, at 0.093 cm radius. The lower Mach number for DT 14 is due to the high sound speed in DT. During the next few ns the DT shock 34 diminishes in amplitude, as it converges to the pinch axis, reflects, and then recollides with the imploding Xe shock 32 at 106 ns. At peak compression the DT 14 ignites, and a radially expanding shock 36 is generated on axis. At this time the pinch outer radius is, $R_f$=0.01 cm and the azimuthal magnetic field is, $B_\theta$=560 MG. Such a high-intensity magnetic field traps the fusion $\alpha$ particles inside the target 14, providing an additional source of heating for target ignition. When the DT plasma pressure exceeds the inertial pressure of the liner 12, the pinch explodes, driven by the production of internal energy.

Some flux leakage occurs, but we assume that most of it remains during the fusion burn. Assuming an average value for $B_\theta$ of 100 MG and a 3.5 MeV $\alpha$ particle energy, the corresponding $\alpha$ particle gyroradius would be, $\rho_{60}$=0.002 cm, which is roughly an order of magnitude less than the final pinch radius, $R_f$. Based on the one dimensional line averages presented above, nearly all of the initial Xe mass participates in the implosion and is compressed into a thin layer, approximately 0.001 cm thick, at the outer surface of the DT 14, at peak implosion, with an average radius of 0.01 cm. Although some instability is evident at this time, with an approximate wavelength of $\lambda$=1 mm, the effect of instability is exaggerated by the expanded radial-scale displayed in the figures, relative to the axial-scale length. For the most part the pinch remains largely intact and stable as the fusion-burn proceeds.

Figure 10A:
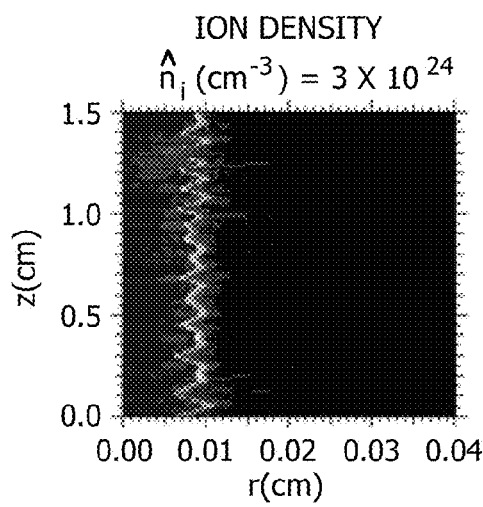
FIGS. 10a-10d are two dimensional graphs of the R-Z iso-contour profiles of ion density, axial-current density, ion temperature, and azimuthal-magnetic field respectively computed at 121.17 ns into the compression. The corresponding peak parameter values are shown at the top each panel.
Figure 10B:
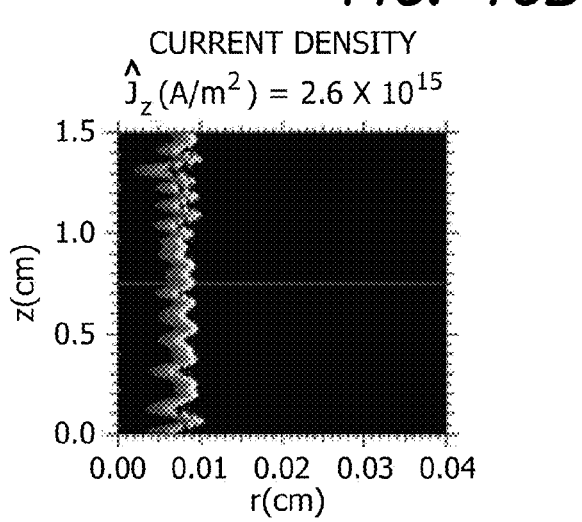
Figure 10C:
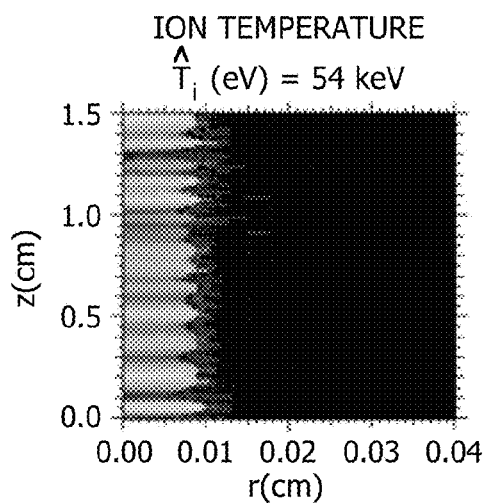
Figure 10D:
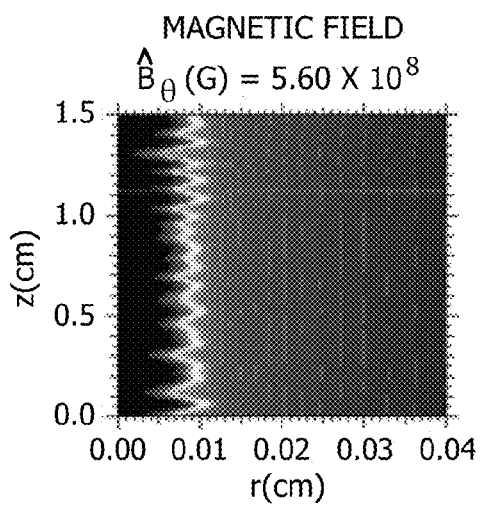

FIGS. 10a-10b provide a summary of the simulated pinch parameters at peak compression at 121.17 ns (ion density, axial-current density, ion temperature, and magnetic field respectively). Also indicated are the peak values for each parameter, obtained from the one dimensional line-outs of FIG. 9. Note the magnified radial scale of these images, relative to previous figures.

The illustrations in FIGS. 10a-10d provide a good indication of the final radial-compression ratio for the pinch at peak implosion. Taking the initial radius of, $R_i$=0.5 cm and the final radius of, $R_f$=0.0067–0.011 cm, the pinch compression ratio is in the range, $R_i/R_f \approx 45$-75. Radial compression ratios of 40-45 have been reported in an experimental configuration similar to the one simulated here; that is for a multi-shell, gas-puff implosion. At the higher end, a radial compression ratio in excess of 120 has been reported for an extruded-shell staged Z-pinch. So the compression ratio simulated here is reasonable.

As shown in FIGS. 10a-10d, less than a ns after peak compression, the entire Z-pinch column becomes RT unstable and the pinch disintegrates (light-fluid DT plasma pushing against the heavy-fluid Xe liner). The last recorded output for data is at 122.5 ns, and the calculation stops at 123 ns.

Figure 11:
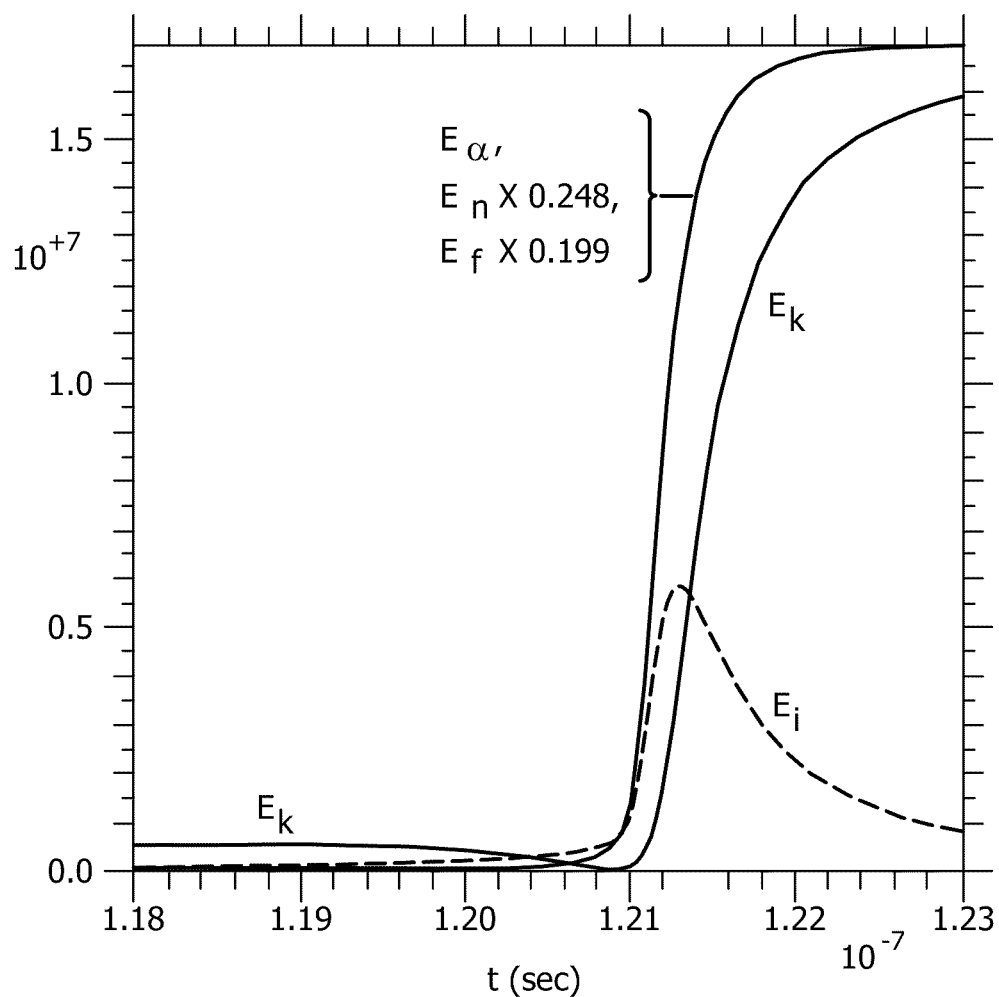
FIG. 11 is a graph of various energies in the staged Z-pinch implosion as a function to time, namely alpha-particle energy, $E_\alpha$, liner-kinetic energy, $E_k$, ion-thermal energy, $E_i$, scaled neutron energy, $E_n \times 0.248$, and scaled total-fusion energy, $E_f \times 0.199$.

The time-evolution of the staged Z-pinch energies are shown in FIG. 11 for the expanded time interval of, t=118-123 ns, including: alpha-particle energy, $E_\alpha$, implosion-kinetic energy, $E_k$, ion energy, $E_i$, scaled neutron energy, $E_n \times 0.248$, and scaled fusion energy, $E_f \times 0.199$. Near peak compression $E_k$ decreases to zero, from a peak value of, $E_k$=0.06 MJ at 118 ns as implosion kinetic energy is converted into plasma thermal energy. The ion energy $E_i$ begins to increase around 119 ns. At 120.9 ns $E_i$ begins to increase rapidly to a peak value of, $E_i$=0.6 MJ at 121.3 ns. The rapid increase in $E_i$ at 120.9 ns is driven by compression and $\alpha$ particle heating. The pinch stagnation time is roughly given by the time interval between when $E_i$ increases rapidly and $E_k$ remains low.

From FIG. 11 $t_{stagnation} \approx 0.3$ ns. Near the end of the fusion burn, at 121.2 ns, $E_k$ begins to increase rapidly, as the staged Z-pinch internal pressure increases, rising to a peak value of 1.58 MJ at the end of the calculation. The total fusion energy is equal to the sum of the neutron and alpha particle energies, $E_f=E_\alpha+E_n$, which attain their peak values at the end of the calculation, $E_f$=84 MJ, $E_\alpha$=17 MJ, and $E_n$=67 MJ and a neutron yield of, $Y \approx 3.0 \times 10^{19}$. This level of fusion energy is 42 times greater than the energy initially stored the circuit capacitor. For comparison, our one dimensional simulations for the same configuration predict a 70 MJ yield.

FIG. 12 is a graph which shows the total ion heating power $P_i$=$dE_i$/dt versus time, on a logarithmic scale. The full simulation time is shown in the inset. Four distinct time phases are evident, characterizing the implosion dynamics of the staged Z-pinch. These phases are defined as the times when various ion-heating mechanisms dominate and are labeled as: Ohmic, Shock, Adiabatic, and $\alpha$-Particle. The value of $P_i$ displayed is due to Ohmic heating, which dominates in the early phase of the implosion, from 0-78 ns. This is the phase when the $J_z \times B_\theta$ force remains small and the staged Z-pinch plasma remains at rest. As shown there is a competition between the plasma pressure outward and the magnetic pressure inward, leading to a quasi-static equilibrium, where $P_i$ oscillates as shown in the inset of FIG. 12.

The shock heating phase begins at approximately 80 ns, as correlated with the density and temperature spikes shown in FIGS. 7 and 8. During this phase a shock propagates toward and reflects off the pinch axis, rapidly heating the target 14 at one to two orders of magnitude higher power level than during the Ohmic phase. The oscillation observed during the Ohmic phase, being several orders of magnitude less, is not observed during this and subsequent phases. At 101 ns, the shock reflects off the axis of the staged Z-pinch chamber and the target plasma temperature is about 150 eV. From 101 ns to 121 ns shocks continue to reflect back and forth inside the target plasma 14 contributing further to ion heating.

From approximately 115 ns onward, adiabatic heating dominates until approximately 120 ns. The onset of $\alpha$ particle heating occurs during the final ns, or so, when the target temperature increases rapidly to approximately 50 keV and the plasma releases the maximum amount of fusion energy.

In summary, we disclose two dimensional simulations of a staged Z-pinch fusion implosion. The load is a 0.2 cm thick shell of Xe gas liner 12 imploding onto a DT target 14 (staged Z-pinch). The system is driven by a 95 ns rise time, 17 MA, 2 MJ current pulser. The two dimensional simulations were performed using MACH2, a sophisticated radiation hydrodynamics code. We have considered several cases for the pinch initial radius, ranging from 2.0 cm down to 0.5 cm. The implosion dynamics are very sensitive to the choice of the initial radius, the atomic composition of the liner mass, and the final pinch stability. High performance is obtained through careful optimization of these parameters: i.e., the liner thickness, the liner mass distribution, and the target mass. The best stability is produced for the smallest initial radius simulated. The pinch produces precisely timed shocks that originate in the Xe liner 12 and are transmitted across the mass boundary, into the DT target 14. Target shocks reflect inside the DT 14 as it is compressed by the Xe liner 12. For the duration of the implosion the pinch remains stable. There does exist a theoretical basis to account for enhanced stability in a shock compressed implosion system.

The dwell time of the pinch at maximum compression is around 0.3 ns, as the pinch is compressed by the liner inertia, in the presence of an intense azimuthal magnetic field; the latter is a result of flux compression. The implosion is accurately characterized as "magento-inertial" and produces a nominal radial-compression ratio for the liner 12 of 50 and a fusion-energy gain that is 42 times greater than the stored, capacitor-bank energy. The total neutron yield obtained in these simulations is $3.0\times10^{19}$. A machine of 50-100 KJ will produce lower neutron flux, about $3.0\times10^{16}$, that may be very useful for the production radionuclides in a controlled environment.

Three dimensional simulations of staged Z-pinches have appeared recently, directed principally toward the analysis of wire-array implosions. For wire-array loads a three dimensional simulation is critical, since the discrete nature of the wire array load inevitably introduces azimuthal non-uniformities.

However, for the small initial radius of a staged Z-pinch, and for a uniform, solid-fill liner, a three dimensional simulation is not expected to be as critical. Indeed, even for our one dimensional calculations the predicted fusion-energy yield was 70 MJ, which is less than two dimensional predictions for 85 MJ, where one would expect a lower yield because of the higher dimensionality. The higher yield for the two dimensional simulation is probably due to the appearance of hot spots, generated at the first collapse of the on-axis shock.

Implementation of a staged Z-pinch in vacuum-free load environment is illustrated. This implementation revolutionizes the viability of the staged Z-pinch methodology, providing for a higher pulse-repetition rate, increased output-energy gain, and a dramatically decreased production cost. However, without the vacuum constraint, which is typical of all conventional Z-pinch devices configured to date, it is far easier to visualize a pathway for a power generating plant based on staged Z-pinch fusion.

A further opportunity for the staged Z-pinch, is the potential that a staged Z-pinch may be used to produce fusion in a neutron-free (aneutronic) reaction using advanced fusion fuels. The vast majority of studies to date on Z Pinch fusion have involved the use of deuterium and tritium (DT) fuels. DT produces over 80% of its nuclear energy in the form of high-energy neutrons. Neutrons are less preferred for the production of electric power, since they also induce low-level radioactivity in the surrounding structure and cannot be directed efficiently into an energy converter. For example, in a DT reaction the nuclear energy is captured in a flowing-liquid skirt of lithium, or similar neutron-absorbing fluid layer, located on the outside of the pinch. The thermal energy of the liquid is then converted into electricity using a conventional thermal cycle. With advanced fuels, for example: combinations of deuterium and helium-3, or hydrogen and boron-11, the nuclear reaction produces over 80% of its output in the form of charged particles which could be captured more readily for direct-energy conversion.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method for using staged Z-pinch plasma compression to produce net energy gain comprising:
   providing a fusible target embedded in a high Z liner;
   ohmically heating the fusible target embedded in a high Z liner;
   shock heating the embedded fusible target;
   adiabatically heating the embedded fusible target by compression;
   igniting the embedded fusible target; and
   charged-particle heating the embedded fusible target as the embedded fusible target is being ignited by trapping a large magnetic field between the high Z liner and a shock front created by the imploding fusible target.

2. The method claim 1 where the fusible target embedded in a high Z liner forms a plasma and where ohmically heating, shock heating, adiabatically heating and charged-particle heating the fusible target are each performed with a progressively smaller time duration and correspondingly higher ion heating power and where the method further comprises:
   causing the high Z liner to implode onto the fusible target to provide a stable compression of the liner; and
   forming of a shock front that compresses and heats the target plasma while preserving the stability of the plasma.

3. The method of claim 1 where providing a fusible target embedded in a high Z liner comprises forming a central plasma of the fusible target and embedding the fusible target in a selected co-axial high Z liner and further comprising maintaining an implosion cycle duration less than that which is capable of causing disruption due to instability of the central plasma.

4. The method of claim 1 where shock heating the fusible target comprises forming a shock front and preventing instabilities in a plasma created in the fusible target.

5. The method of claim 1 comprising repeating the steps of ohmically heating, shock heating, adiabatically heating and charged-particle heating the fusible target at a high repetition-rate using a pulsed-power driver while controlling plasma instabilities.

6. The method of claim 1 where providing a fusible target embedded in a high Z liner comprises providing a plasma configuration characterized as an outer enveloping liner of radon, xenon, or krypton outer liner, and an inner enveloped hydrogen isotope target.

7. The method of claim 1 further comprising providing a pulsed power source to provide a fast rise time current pulse to cause the high Z liner to implode onto the fusible target to provide a stable compression of the liner and formation of a shock front that compresses and heats the target plasma rapidly to a temperature >5 keV and a particle density >$10^{23}$ cm$^{-3}$.

8. The method of claim 1 further comprising producing fusion in a predominantly neutron-free (aneutronic) reaction using aneutronic fusion fuel including deuterium and helium-3, or hydrogen and boron-11.

9. The method of claim 1 where shock heating, adiabatically heating, igniting charged-particle heating the embedded fusible target comprises forming a shock front at the interface between the liner and the target plasma as the liner implodes which shock front detaches from the slower-moving liner and forms an independent current channel, colliding the shock wave with the outer surface of the target, accelerating the shock wave inward, rapidly heating the target, adiabatically compressing the target and liner and amplifying current in the target and liner to converge the liner mass toward a central axis of the fusible target to compress the target to a fusion condition to begin to ignite fusion reactions, producing charged particles, trapping the charged particles in a large magnetic field surrounding the target and depositing the energy of the charged particles into the target to further heat the target to produce an energy gain.

10. The method of claim 1 further comprising producing fusion energy in the form of a high flux of pulsed neutrons, with an energy equivalent yield greater than the energy required to assemble the reaction.

11. The method of claim 1 further comprising selecting a liner initial radius, liner thickness, liner linear mass distribution and the target initial radius, target thickness, target linear mass distribution to result in staged target ignition.

12. The method of claim 1 further comprising selecting a precise set of initial-implosion parameters to produce net-fusion energy, wherein the initial-implosion parameters comprise a radius of the high Z liner, a thickness of the high Z liner, and density of the fusible target.

* * * * *